(12) United States Patent
Nam et al.

(10) Patent No.: US 11,976,411 B2
(45) Date of Patent: May 7, 2024

(54) LAUNDRY PROCESSING APPARATUS

(71) Applicant: LG Electronics Inc., Seoul (KR)

(72) Inventors: Hyun Su Nam, Seoul (KR); Jun Seok Lee, Seoul (KR); In Baeg Jang, Seoul (KR)

(73) Assignee: LG Electronics Inc., Seoul (KR)

(*) Notice: Subject to any disclaimer, the term of this patent is extended or adjusted under 35 U.S.C. 154(b) by 899 days.

(21) Appl. No.: 16/983,409

(22) Filed: Aug. 3, 2020

(65) Prior Publication Data
US 2021/0032796 A1 Feb. 4, 2021

(30) Foreign Application Priority Data

Aug. 2, 2019 (KR) .................. 10-2019-0094400

(51) Int. Cl.
| | | |
|---|---|---|
| *D06F 58/22* | (2006.01) | |
| *D06F 39/10* | (2006.01) | |
| *B01D 46/10* | (2006.01) | |
| *D06F 39/06* | (2006.01) | |
| *D06F 58/45* | (2020.01) | |

(52) U.S. Cl.
CPC ............. *D06F 58/22* (2013.01); *D06F 39/10* (2013.01); *B01D 46/10* (2013.01); *D06F 39/06* (2013.01); *D06F 58/45* (2020.02)

(58) Field of Classification Search
CPC .......... D06F 58/22; D06F 33/00; D06F 39/10; D06F 58/24; B01D 46/10
USPC ... 34/82, 595, 606, 132, 138, 242, 300, 480, 34/493, 497, 499, 528, 5, 54, 558, 601, 34/602, 603, 608, 85, 89
See application file for complete search history.

(56) References Cited

U.S. PATENT DOCUMENTS

| | | | |
|---|---|---|---|
| 2011/0016736 A1* | 1/2011 | Kim ........................ | D06F 58/22 34/82 |
| 2015/0144748 A1 | 5/2015 | John et al. | |
| 2019/0351459 A1* | 11/2019 | Dal Molin .............. | D06F 58/22 |

FOREIGN PATENT DOCUMENTS

| | | |
|---|---|---|
| DE | 2012209124 | 12/2013 |
| EP | 2682515 | 1/2014 |
| EP | 2843122 | 3/2015 |
| JP | 2007307067 | 11/2007 |
| JP | 2008079855 | 4/2008 |

(Continued)

OTHER PUBLICATIONS

PCT International Search Report in International Appln. No. PCT/KR2020/010184, dated Nov. 13, 2020, 7 pages (with English translation).

(Continued)

*Primary Examiner* — Allison G Fitzsimmons
(74) *Attorney, Agent, or Firm* — Fish & Richardson P.C.

(57) ABSTRACT

A laundry processing apparatus includes a filter assembly that is detachably supported by a filter holder positioned between a processing module and a guide duct, and an inner filter and an outer filter that are overlappingly assembled with each other, and removes debris contained in circulated air and then supplies the circulated air into the guide duct. The filter holder is assembled with a sealing member, and the sealing member is provided to cover at least a part of an outer surface of the outer filter to seal a gap between the outer filter and the filter holder, and a part of the sealing member protrudes toward the inner filter to seal a gap between the inner filter and the outer filter.

20 Claims, 20 Drawing Sheets

(56) References Cited

FOREIGN PATENT DOCUMENTS

| KR | 1020170016729 | 2/2017 | | |
|---|---|---|---|---|
| KR | 20180100751 | 9/2018 | | |
| KR | 1020180100751 | 9/2018 | | |
| WO | WO2015028237 | 3/2015 | | |
| WO | WO-2018121867 A1 * | 7/2018 | ......... | B01D 46/0065 |

OTHER PUBLICATIONS

European Search Report in International Appln. No. 20188998.7-1016, dated Nov. 17, 2020, 8 pages.

\* cited by examiner

LAUNDRY PROCESSING APPARATUS

CROSS REFERENCE TO RELATED APPLICATION

The present application claims priority to Korean Patent Application No. 10-2019-0094400, filed on Aug. 2, 2019, the entire contents of which is incorporated herein for all purposes by this reference.

TECHNICAL FIELD

The present disclosure relates generally to a laundry processing apparatus and, more particularly, to a laundry processing apparatus having a filter assembly provided for filtering debris contained in air after processing clothing.

BACKGROUND

Generally, a laundry processing apparatus means all devices for managing clothing, such as washing, drying, and removing wrinkles, at home or at laundromat. For example, the laundry processing apparatus includes a washing machine for clothing, a drying machine for clothing, a washing machine having both drying and washing functions, a refresher for refreshing clothing, a steamer for removing wrinkles of clothing, and the like.

The clothing drying machine of the laundry processing apparatus includes a heat pump system. The clothing drying machine is configured to supply high temperature air to an object to be processed such as clothing and bed linen (hereinafter, it is referred to as clothing) which are inserted into a processing space (drum or steamed space in which clothing hangs), through the operation of the heat pump system. Thus, moisture contained in the clothing to be processed is evaporated so that the clothing to be processed is dried.

The clothing drying machine may include an exhaust type drying machine and a condensation type drying machine that are classified according to the processing method of high temperature and humid air escaping from a processing space. The exhaust type drying machine is configured to discharge the high temperature and humid air generated during drying operation directly to the outside of the drying machine. The condensation type drying machine is configured to condense moisture contained in the air through the heat exchange while circulating the high temperature and humid air without discharging the high temperature and humid air to the outside.

In the case of the condensation type drying machine, it is necessary to filter debris such as lint contained in air processing the clothing to be processed. During the air circulation process, debris may be attached to internal components of the laundry processing apparatus and cause malfunction or deteriorate performance. A filter is provided in a path where air is circulated in order to filter debris.

Herein, in order to increase filtration performance of debris, a gap between the filter and a portion where the filter is mounted should be reduced, and for this purpose, a sealing member may be provided between the filter and the portion. The sealing member is formed of a flexible material such as rubber and blocks the gap between the filter and the portion where the filter is mounted, and guides air to move only through the filter, not around the filter.

Meanwhile, the filter may be a dual filter, for example, an inner filter and an outer filter may be overlappingly assembled with each other and filter debris dually. When the dual filter is assembled and then is provided in the laundry processing apparatus, circulated air passes through the inner filter and then outer filter to circulate the inside of the laundry processing apparatus.

However, the circulated air may be introduced between the inner filter and the outer filter constituting the existing dual filter. When an assembly portion between the inner filter and the outer filter is not completely in close contact with each other, some of the circulated air may be introduced thereinto, and the introduced air passes only through the outer filter without passing through inner filter. To solve the above problem, the sealing member may be newly provided between the inner filter and the outer filter, but this has problems of increasing the number of components and the number of manufacturing processes.

Further, in the process of removing and mounting the filter in the laundry processing apparatus, interference may occur between the filter and the sealing member. In this case, the sealing member is separated from the laundry processing apparatus and the laundry processing apparatus is operated in the state in which the sealing member is not mounted. Thereby, filtration of debris is not performed, and the separated sealing member may be lost.

Meanwhile, among the conventional laundry processing apparatus, there are products without the sealing member. In this case, some of the circulated air is introduced into the inside of the apparatus without passing through the filter, so debris may not be filtered. A method of adding the sealing member later may be also be considered, but it is difficult to secure additional space for providing the sealing member in a filter mounting portion of the laundry processing apparatus, which has already manufactured.

Documents of Related Art (Patent Document 1) Korean Patent Application Publication No. 10-2011-0123333

SUMMARY

Accordingly, the present disclosure has been made keeping in mind the above problems occurring in the related art, and the present disclosure is intended to seal a gap between a filter and a filter mounting part as well as a gap between an inner filter and an outer filter that constitute the filter.

Another objective of the present disclosure is to seal the gap between the filter and the filter mounting part and the gap between the inner filter and the outer filter that constitute the filter by using a one sealing member.

A further objective of the present disclosure is to prevent separation of the sealing member occurring by the interference occurring in the process of mounting and separating the filter.

Still another objective of the present disclosure is to add the sealing member to the existing laundry processing apparatus without the sealing member to increase the filtering performance.

Particular implementations described herein provide a laundry processing apparatus that includes a drum, a guide duct, and a filter holder. The drum may define a receiving space for receiving an object and include an open side for discharging air that circulates in the receiving space. The guide duct may guide the circulating air toward a heat exchange module. The filter holder may be positioned between the drum and the guide duct and be configured to detachably support a filter assembly. The filter assembly may include an inner filter and an outer filter that at least partially overlap with each other and are configured to remove debris contained in the circulating air that is supplied to the guide duct. A sealing member may at least partially cover the outer filter and seal a first gap between the outer filter and the filter holder. The sealing member may include a portion that contacts the inner filter and that seals a second gap between the inner filter and the outer filter.

In some implementations, the laundry processing apparatus may optionally include one or more of the following features. The sealing member may include a first sealing part that protrudes from the outer filter toward the filter holder and that seals the first gap, and a second sealing part that protrudes from the outer filter toward the inner filter and that seals the second gap. The outer filter may include a seating end that protrudes along an edge of an insert hole of the outer filter that receives the inner filter. The seating end may be disposed between the inner filter and the filter holder. The sealing member may be coupled to the outer filter and cover the seating end of the outer filter. The filter holder may include a filter storage space and a holding end that is positioned at an edge of the filter storage space and that supports the seating end of the outer filter. The seating end of the outer filter may be positioned between the holding end of the filter holder and a lower surface of a filter head of the inner filter that protrudes from an upper portion of the inner filter. Based on the outer filter and the inner filter being disposed in the filter holder, a first sealing part of the sealing member may extend toward the holding end of the filter holder and a second sealing part of the sealing member may extend toward the lower surface of the filter head of the inner filter. The sealing member may include a base, a first sealing part, a connector, and a second sealing part. The base may extend along a lower surface of the seating end of the outer filter and be coupled to the outer filter. The first sealing part may protrude from the base in an inclined direction toward the filter holder. The connector may extend from the base and cover an outmost edge of the seating end of the outer filter. The second sealing part may protrude from the connector and cover an upper surface of the seating end of the outer filter toward the inner filter. The first sealing part of the sealing member may extend from the base less than the connector of the sealing member or the outmost edge of the seating end. The second sealing part of the sealing member may be positioned between a lateral surface of the seating end of the outer filter and a portion of the inner filter that is received in the filter holder. The first sealing part may include a portion that is spaced apart from the lower surface of the seating end of the outer filter at a distance that gradually changes from the base toward a distal end of the first sealing part. Based on the outer filter being disposed in the filter holder, the first sealing part may be flexed toward the seating end of the outer filter and be disposed between the lower surface of the seating end of the outer filter and the filter holder. The distal end of the first sealing part may be thinner than a proximate end of the first sealing part that is connected to the base. The second sealing part may extend along a longitudinal direction of the connector of the sealing member, and have a protruding height that gradually increases toward a center of the apparatus. The connector of the sealing member may include a lower surface coupling plate that contacts the lower surface of the seating end of the outer filter, a lateral surface coupling plate that is connected to the lower surface coupling plate and covers a lateral surface of the seating end of the outer filter, and an upper surface coupling plate that is connected to the lateral surface coupling plate and contacts the upper surface of the seating end of the outer filter. The second sealing part may protrude from the upper surface coupling plate. The lower surface coupling plate, the lateral surface coupling plate, and the upper surface coupling plate of the sealing member may define a pocket that partially receives the seating end of the outer filter. The lower surface of the seating end of the outer filter may have a lower stepped surface that connects the lower surface coupling plate of the connector and that prevents the lower surface coupling plate from protruding toward the filter holder beyond the lower surface of the seating end of the outer filter. The upper surface of the seating end of the outer filter may have an upper stepped surface that connects the upper surface coupling plate of the connector and that prevents the upper surface coupling plate from protruding toward the inner filter. A coupling rib may protrude from a lower surface of the seating end of the outer filter and be configured to increase a coupling force between an outmost edge of the seating end of the outer filter and a pocket of the sealing member. The sealing member may be connected to the outer filter based on one of insert injection, thermal fusion, ultrasonic fusion, and laser fusion. The outer filter may include a plastic material and the sealing member includes thermoplastic styrenic elastomers.

Particular implementations described herein provide a laundry processing apparatus that may include a drum, a guide duct, and a filter holder. The drum may define a receiving space for receiving an object and include an open side for discharging air that circulates in the receiving space. The guide duct may guide the circulating air toward a heat exchange module. The filter holder may be positioned between the drum and the guide duct and be configured to detachably support a filter assembly that removes debris contained in the circulating air that is supplied to the guide duct. The filter assembly may include an outer filter that is mounted to the filter holder, an inner filter that is inserted in an insert hole of the outer filter and that overlaps with the outer filter, and a sealing member covers at least partially the outer filter and seals a first gap between the outer filter and the filter holder. The sealing member may include a portion that contacts the inner filter and that seals a second gap between the inner filter and the outer filter.

In some implementations, the laundry processing apparatus may optionally include one or more of the following features. The sealing member may include a first sealing part that protrudes from the outer filter toward the filter holder and that seals the first gap, and a second sealing part that protrudes from the outer filter toward the inner filter and that seals the second gap. The outer filter may include a seating end that protrudes along an edge of the insert hole of the outer filter that receives the inner filter. The seating end may be disposed between the inner filter and the filter holder. The sealing member may be coupled to the outer filter and covers the seating end of the outer filter. The filter holder may include a filter storage space and a holding end that is positioned at an edge of the filter storage space and that supports the seating end of the outer filter. The seating end of the outer filter may be positioned between the holding end of the filter holder and a lower surface of a filter head of the inner filter that protrudes from an upper portion of the inner filter. Based on the outer filter and the inner filter being disposed in the filter holder, the first sealing part of the sealing member may extend toward the holding end of the filter holder and the second sealing part of the sealing member may extend toward the lower surface of the filter head of the inner filter. The sealing member may include a base that extends along a lower surface of a seating end of the outer filter and that is coupled to the outer filter, a first sealing part that protrudes from the base in an inclined direction toward the filter holder, a connector that extends from the base and that covers an outmost edge of the seating end of the outer filter, and a second sealing part that protrudes from the connector and that covers an upper surface of the seating end of the outer filter toward the inner filter.

According to the characteristics of the present disclosure for achieving the above objectives, the present disclosure includes an inner filter and an outer filter that are overlappingly assembled with each other, and a sealing member is coupled to the inner filter and the outer filter. The sealing member may be provided to cover at least a part of an outer surface of the outer filter that may be assembled with a filter holder to seal a gap between the outer filter and the filter holder, a part of the sealing member may be in contact with the inner filter to seal a gap between the inner filter and the outer filter. Accordingly, the sealing member may seal (i) the gap between the inner filter and the outer filter that constitute a filter assembly and (ii) the gap between the filter assembly and the filter holder, and may prevent the leakage of the circulated air.

The sealing member of the present disclosure may be configured such that, a first sealing part blocking the gap between the inner filter-the outer filter and a second sealing part blocking the gap between the filter assembly and the filter holder may be integrally formed in a single body. Accordingly, collecting performance of debris may be increased and the number of components and the number of manufacturing processes may not be increased.

In the present disclosure, the sealing parts of the sealing member may be positioned in locations retracted inward toward the center of a filter mounting space without protruding outward. Therefore, in the process of removing or reinstalling the filter assembly from the filter holder, the sealing member may be less likely to interfere with the filter holder or other components.

The sealing member of the present disclosure may be provided in the detachable filter assembly, not the filter holder fixed to the laundry processing apparatus, and may be formed in a shape covering a seating end protruding on the filter assembly. Accordingly, even when the design of a main body of the laundry processing apparatus is not changed, the sealing member of the present disclosure may be added in the apparatus and the filtration performance may be improved.

In the present disclosure, the filter assembly may be detachably supported by the filter holder positioned between the processing module and a guide duct, and may include the inner filter and the outer filter overlappingly assembled with each other to remove debris contained in the circulated air and to supply the circulated air to the guide duct. The filter holder may be assembled with the sealing member, and the sealing member may be provided to cover at least a part of the outer surface of the outer filter to seal the gap between the outer filter and the filter holder, and a part of the sealing member may protrudes toward the inner filter to seal the gap between the inner filter and the outer filter.

The sealing member may include the first sealing part that protrudes from the outer filter toward the filter holder to seal the gap between the outer filter and the filter holder, and the second sealing part that protrudes from the outer filter toward the inner filter to seal the gap between the outer filter and the inner filter. That is, the sealing member (the first sealing part) blocking the gap between the inner filter and the outer filter and the sealing member (the second sealing part) blocking the gap between the filter assembly and the filter holder may not be separate parts and may consist of a one sealing member. Accordingly, the collecting performance of debris may be increased and the number of components and the number of manufacturing processes may not be increased, so that the manufacturing cost of the laundry processing apparatus may be prevented from being increased.

The seating end of the outer filter where the sealing member may be coupled may be positioned between a holding end that holds the seating end and may be positioned at an edge of a filter storage space of the filter holder and a lower surface of a filter head protruding from an upper portion of the inner filter, and when the outer filter and the inner filter are provided in the filter holder, a first sealing part of the sealing member may be directed toward the holding end of the filter holder and a second sealing part thereof may be directed toward the lower surface of the filter head of the inner filter. Accordingly, the sealing parts may naturally perform the sealing function in the process of assembling the filter assembly and the filter holder or the process of assembling the inner filter and the outer filter.

The sealing member may include a base extended along a lower surface of the seating end of the outer filter and coupled to the outer filter, a first sealing part protruding from one end of the base to an outside and extended in an inclined direction toward the filter holder, a connector extended from the base and covering an outside edge of the seating end, and a second sealing part protruding from an outer surface of the connector covering an upper surface of the seating end toward the inner filter. That is, the sealing member may be formed in a shape covering the seating end protruding from the filter assembly. Therefore, it may be unnecessary to modify the design of the body of the laundry processing apparatus, and the structure that may be added to the existing laundry processing apparatus may be provided.

A protruding end of the first sealing part may be extended only to a position retracted inward toward a center of a filter mounting space accommodating the inner filter than the connector of the sealing member or an edge of the seating end, and the second sealing part may be positioned at a location retracted inward from the connector of the sealing member covering a lateral surface of the seating end toward a center of the filter coupling space accommodating the inner filter. Accordingly, in the process of removing or reinstalling the filter assembly from the filter holder, the sealing member may be less likely to interfere with the filter holder or other components.

The first sealing part may be gradually spaced apart from the lower surface of the seating end of the outer filter as the first sealing part goes toward the protruding end of the first sealing part, and when the outer filter is provided in the filter holder, the first sealing part may be elastically transformed in a direction of the seating end to be in close contact between the lower surface of the seating end and the filter holder.

A lower surface coupling plate, a lateral surface coupling plate, and an upper surface coupling plate of the sealing member may define a pocket in which a part of an outer edge of the seating end may be inserted. By using the pocket, the sealing member may be fixed to the filter assembly by various methods, such as thermal fusion, vibration fusion, ultrasonic fusion, etc.

the lower surface of the seating end may have a lower stepped surface to which the lower surface coupling plate of the connector may be coupled, thereby preventing the lower surface coupling plate from protruding toward the filter holder than the lower surface of the seating end, and the upper surface of the seating end may have an upper stepped surface to which the upper surface coupling plate of the connector may be coupled, thereby preventing the upper surface coupling plate from protruding toward the inner filter. That is, the overall thickness of the first seating end 563 may be prevented from being increased due to the thickness of the sealing member 580 itself.

A coupling rib may protrude from a lower surface of the seating end to increase coupling force between a part of an outer edge of the seating end and an inside surface of a pocket of the sealing member.

As described above, the laundry processing apparatus according to the present disclosure has the following effects.

The circulated air discharged from the processing module (drum, etc.) loses debris while passing through the filter assembly. The sealing member seals (i) the gap between the inner filter and outer filter that constitute the filter assembly, and (ii) the gap between the filter assembly and the filter holder, so that the leakage of the circulated air can be prevented. That is, the circulated air is guided to pass through the filter assembly, which is an originally intended circulation path, without leaking into other paths, so that the filtration rate of debris can be improved.

A sealing member blocking the gap between the inner filter and the outer filter and a sealing member filling in the gap between the filter assembly and the filter holder are formed of a one sealing member, not separate members. Accordingly, while the collecting performance of debris is increased, the number of components and the number of manufacturing processes are not increased, thus the manufacturing cost of the laundry processing apparatus is prevented from being increased.

The sealing member has the first sealing part and the second sealing part, and the first sealing part and the second sealing part seal the gap between the filter assembly and the filter holder and the gap between the inner filter and the outer filter, respectively. The first and second sealing parts naturally perform the sealing function in the process of assembling the filter assembly and the filter holder or the process of assembling the inner filter and the outer filter. Accordingly, an operator or user does not need to perform a separate operation for sealing, so that usability can be increased.

The first and second sealing parts of the sealing member of the present disclosure are in positions retracted inward toward the center of the filter assembly without protruding outward. Accordingly, in the process of removing or reinstalling the filter assembly from or in the filter holder, it is less likely to interfere with the filter holder or other components. As a result, separation or deformation of the sealing member can be prevented and durability of the filter assembly can be improved.

The sealing member is installed to the separable filter assembly, not the filter holder that is fixed to the laundry processing apparatus and, particularly, the sealing member is formed in a shape covering the seating end protruding from the filter assembly. Accordingly, it is unnecessary to modify the design of the body of the laundry processing apparatus, and the structure that can be added to the existing laundry processing apparatus is provided, so that product compatibility is high and design complexity is low.

The sealing member has the pocket covering the edge of the outer filter, and by using the pocket, the sealing member can be fixed to the filter assembly by various methods, such as thermal fusion, vibration fusion, ultrasonic fusion, etc. Accordingly, the cost of installing the sealing member in the filter assembly can be lowered, and the sealing member can be easily added to the existing filter assembly.

The stepped surface (lower stepped surface and upper stepped surface) corresponding to the pocket of the sealing member is provided at the edge of the outer filter where the sealing member is coupled, so that it is possible to prevent the overall thickness of the outer filter from being increased, due to the thickness of the sealing member itself. In this case, it is possible to prevent the assembly thickness with the inner filter or the filter holder from being increased due to the increased thickness, and the entire structure can be maintained compact even when the filter assembly is assembled.

The outer filter of the filter assembly of the present disclosure is formed of plasticity plastic material and the sealing member is formed of thermoplastic styrenic elastomer material, and then the outer filter and the inner filter can be integrally formed by fusion. Accordingly, without insert injection process using a mold, the sealing member can be firmly coupled to the filter assembly, so that productivity can be improved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
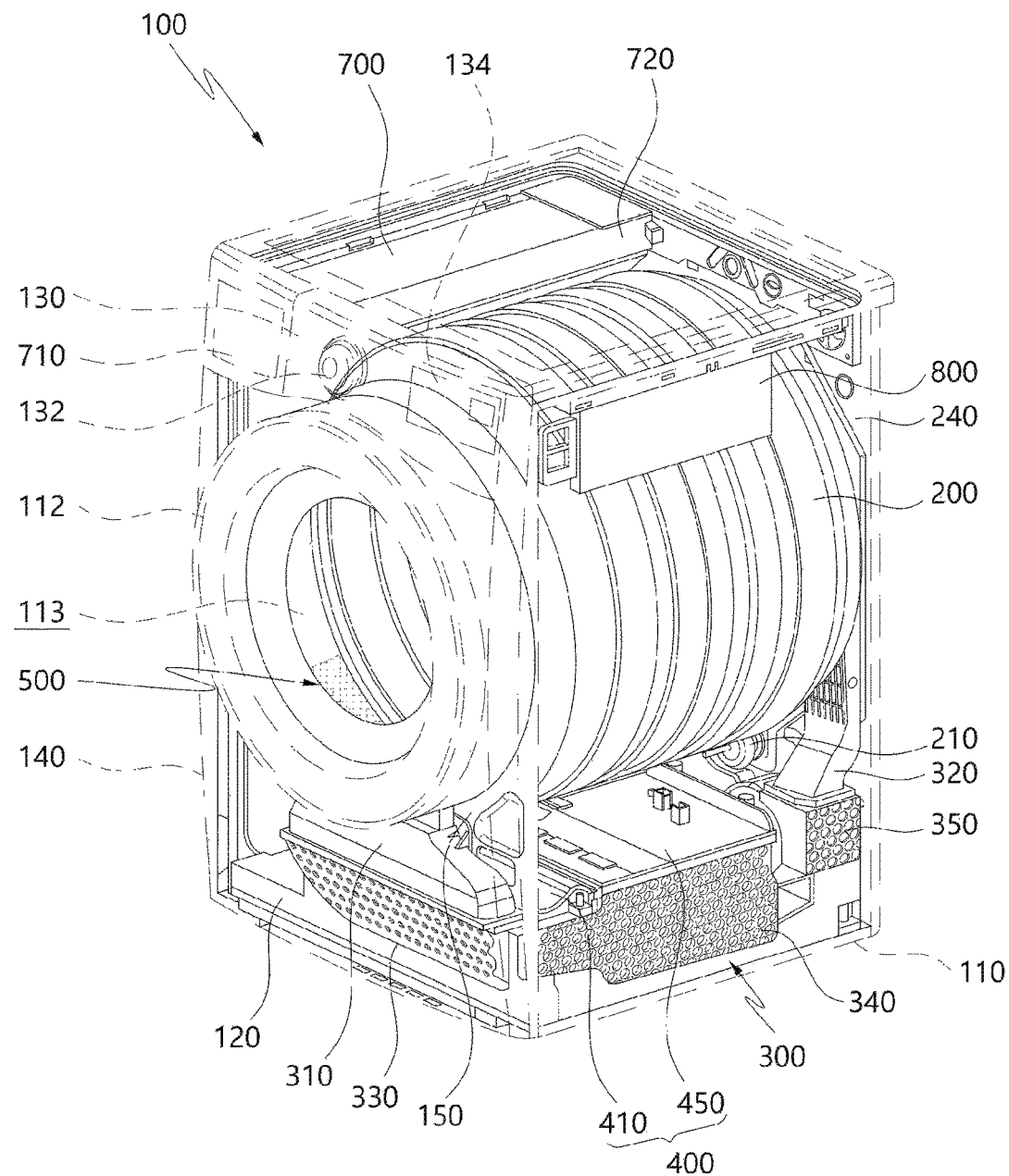
FIG. 1 is a perspective view showing an internal structure of an embodiment of a laundry processing apparatus according to the present disclosure.

Hereinbelow, some embodiments of the present disclosure will be described in detail with reference to exemplary drawings. Like reference numerals are used to identify like elements throughout different drawings. Further, in the following description, when it is decided that the detailed description of known function or configuration related to the implementations makes the subject matter of the present disclosure unclear, the detailed description is omitted.

The present disclosure relates to a laundry processing apparatus and includes a heat pump system. The present disclosure is configured to repeat an operation in which high temperature and dry air supplied from the heat pump system performs heat processing for clothing or bed linen to be processed and then humid air containing moisture while drying clothing to be processed is supplied to the heat pump system again, and circulated. Circulated air processing the clothing to be processed and discharged from a processing module (in the embodiment, the processing module is a drum) contains debris such as lint, etc., so that it is necessary to filter debris. Thus, a filter assembly 500 is arranged at a position adjacent to the processing module. Hereinbelow, the filter assembly 500 will be described in detail.

For reference, a clothing drying machine is described as an example of the laundry processing apparatus, and the present disclosure can be applied to a variety of laundry processing apparatus including the heat pump system, such as a washing machine for drying, a washing machine for both drying and washing, a refresher for refreshing clothing, and a steamer removing wrinkles of the clothing, in addition to the clothing drying machine.

FIG. 1 depicts a configuration of the laundry processing apparatus according to an embodiment of the present disclosure and external structures such as a cabinet 110 are indicated by dotted lines for showing an internal structures. As shown in the drawing, the laundry processing apparatus according to the embodiment of the present disclosure includes the cabinet 110, the processing module 200 (in the following description, the processing module will be referred to as "drum"), the heat pump system, a circulation fan (not shown in the drawing), a drainage tank 700, and a controller 800. Herein, components constituting the heat pump system are dispersively provided at a lower portion of the laundry processing apparatus, and a separate washing unit (now shown in the drawing) may be used to wash the heat pump system by using condensed water.

Describing the components sequentially, the cabinet 110 makes an exterior of the laundry processing apparatus. The cabinet 110 is formed in a container body in which an empty installation space is arranged, and a plurality of components may be assembled to constitute one cabinet 110, and the installation space may be partitioned into several spaces. In the embodiment, the cabinet 110 is formed of a metal material, but may be formed of various materials including synthetic resin. Further, the cabinet 110 has an exterior shape of a roughly hexahedral structure in the embodiment, but the exterior shape thereof may be variously modified.

The cabinet 110 has a door 112 at a front surface thereof, and an entrance 113 for the clothing to be processed is arranged inside the door 112. The entrance 113 for the clothing to be processed is exposed outward when the door 112 is opened, so that the clothing to be processed may be inserted into an interior space of the drum 200. In the embodiment, at least a part of the door 112 is formed of a transparent or translucent material so that the interior space of the drum 200 is visible. The door 112 is opened and closed using a hinge, and a folding method or a sliding method may be applied thereto.

A lower frame 120 is arranged at a lower portion of the cabinet 110. The lower frame 120 has a roughly square frame shape and is positioned in a bottom side of the installation space of the cabinet 110. Various components including the heat pump system are installed in the lower frame 120. The lower frame 120 provides an installation part in which the various components are installed and allows air after completing heat processing to flow through an upper space of the lower frame 120.

An input and output panel 130 is installed at a front surface or an upper surface of the laundry processing apparatus 100. In the embodiment, the input and output panel 130 is installed at a position adjacent to the drainage tank 700. The input and output panel 130 may include an input part 132 through which a user may enter a selection of a clothing processing course and an output part 134 visually displaying operation states of the laundry processing apparatus.

Figure 2:
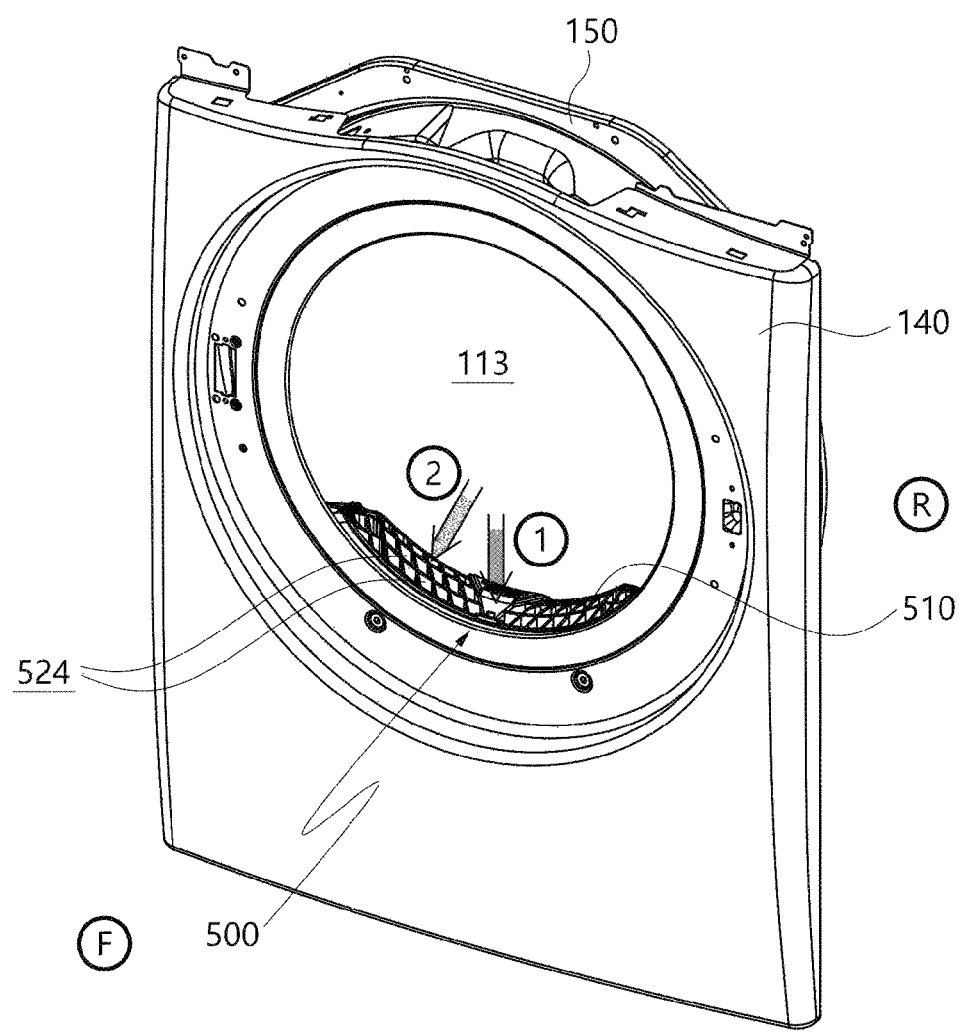
FIG. 2 is a perspective view showing a front frame constituting the embodiment in FIG. 1 and a structure of components coupled to the front frame.
Figure 3:
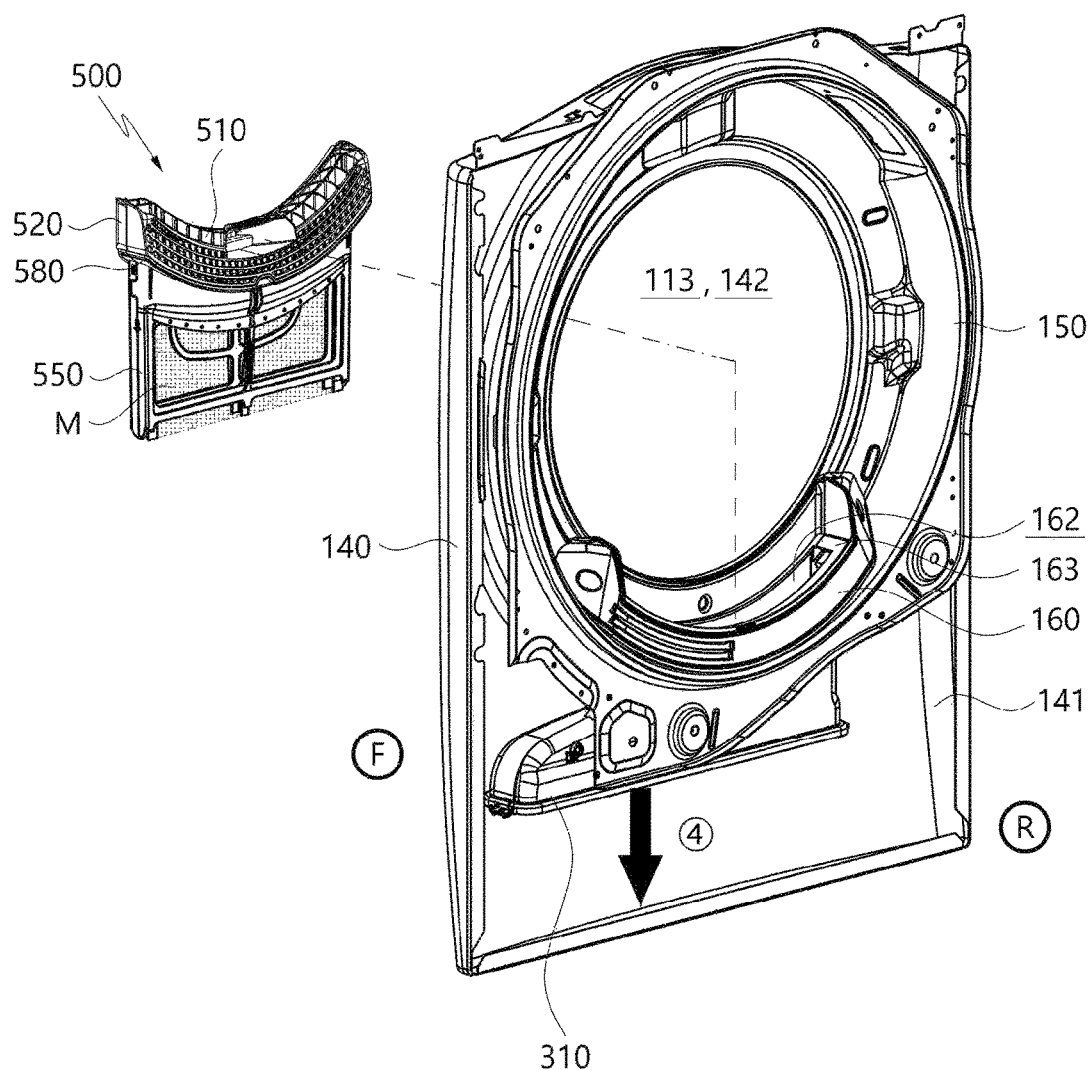
FIG. 3 is a perspective view showing the front frame shown in FIG. 2 in a state where a filter assembly is separated from the front frame, the perspective view being taken from the rear of the front frame.

The front frame 140 is arranged at a front surface of the cabinet 110. The front frame 140 provides the front surface the cabinet 110 and has a wide plate shape, as shown in FIGS. 2 and 3. The center of the front frame 140 has the entrance 113 that communicates with the outside of the apparatus when the door is opened. The shape of the front frame 140 shown in the drawing is only an example, and may be variously modified. For reference, F in the drawings indicates the front of the laundry processing apparatus, and R in the drawings indicates the rear thereof.

A front supporter 150 is coupled to a rear surface of the front frame 140. The front supporter 150 is provided for installation of the drum 200, and is used in a state of being fixed to the rear surface of the front frame 140. The drum 200 is configured such that, opposite ends thereof are respectively coupled to the front supporter 150 and a rear supporter 240 so that the drum 200 is in a rotatable state. The front supporter 150 has a shape of a roughly circular frame and is open frontward, and the open portion thereof may be regarded as a part of the entrance 113. The shape of the front supporter 150 may vary to be suitable for the drum 200.

The front supporter 150 has the filter holder 160. The filter holder 160 serves as a holding frame in which the filter assembly 500 is provided, and is positioned at a lower side of the front supporter 150. The filter holder 160 is positioned on a flow path of circulated air, so that circulated air discharged from the drum 200 passes through the filter assembly 500. However, since the filter holder 160 and the filter assembly 500 are assembled separably from each other, a gap may be formed between the filter holder 160 and the filter assembly 500, and circulated air may be introduced into the gap. The present disclosure is configured to reduce the gap to guide circulated air to pass through the filter assembly 500. The configuration of the filter holder 160 will be described in detail again when the configuration of the filter assembly 500 will be described below.

The drum 200 is installed in the installation space of the cabinet 110 to be rotatable. As shown in FIG. 1, the drum 200 is supported to be rotatable by a roller 210 in the cabinet 110. A plurality of rollers 210 may be installed to be in contact with an outer surface of the drum 200. The drum 200 is formed in a cylindrical container body in which openings are provided at front and rear surfaces thereof.

High temperature and dry air passes through an inside space of the drum 200 to perform heat processing to the clothing to be processed. The high temperature and dry air is introduced through the rear opening of the drum 200 into the inside of the drum 200 and then is discharged through the front opening of the drum 200 to the outside of the drum 200. In FIG. 1, the front supporter 150 is provided at a front side where the door 112 is provided and the rear supporter 240 is provided at a rear side, with the drum 200 disposed between the front supporter 150 and the rear supporter 240. The drum 200 is supported to be rotatable by the front supporter 150 and the rear supporter 240.

Next, a heat exchange module 300 will be described. The heat exchange module 300 includes an evaporator that is provided therein as a heat exchanger, a condenser, and the circulation fan. Further, the heat exchange module 300 includes components 330, 340, and 350 that surround the above components to provide a circulation flow path in the heat exchange module 300 therein. A compressor, a drum motor, etc. are provided at a side opposite to the heat exchange module 300, but are not shown in FIG. 1 because they are covered by other components.

A guide duct 310 is provided in the lower side of the front supporter 150 where is adjacent to a front opening of the drum 200. The guide duct 310 is provided between the heat exchange module 300 and the filter assembly 500, and the guide duct 310 is extended in a vertical direction of the apparatus to connect the filter assembly 500 to a heat exchange guide 330 which will be described below. The guide duct 310 may be regarded as an outlet duct 310 that provides a flow path through which circulated air after heat-exchanging the clothing to be processed in the drum 200 is discharged, and the guide duct 310 itself forms a circulated air flow path.

In FIG. 1, a rear duct connector 320 is provided at a rear opening 205 of the drum 200, and the rear duct connector 320 is also extended in the vertical direction to allow the high-temperature dry air to be introduced into the drum 200. Therefore, as the rear duct connector 320 forms a flow path introduced into the drum 200, the rear duct connector 320 may be an inlet duct 320. As described above, the guide duct 310 and the rear duct connector 320 are respectively positioned at the opposite ends of the heat exchange module 300 so that air before/after the heat exchange may be introduced inward and discharged outward.

Air that has become high temperature and humid while heat-processing the clothing to be processed in the drum 200 is discharged through the front opening and then is introduced toward the filter assembly 500 (referring to arrows ① and ② in FIG. 2). At this point, an inner filter 510 constituting the filter assembly 500 is open vertically and laterally so that the circulated air may be introduced from the top (in direction of arrow ① in FIG. 2) and a side (in direction of arrow ② in FIG. 2) of the inner filter 510.

The circulated air is discharged through the guide duct 310 which is the outlet duct 310 (referring to arrow ④ in FIG. 3), and is guided by the heat exchange guide 330 toward the heat exchanger. The heat exchange guide 330 corresponds to a portion into which the air delivered through the guide duct 310 is introduced. The air is redirected toward the rear of the lower frame 120 while passing through the heat exchange guide 330 to be introduced into the heat exchange module 300.

Herein, the heat exchange module 300 is provided with the heat exchanger, and in which the evaporator which removes moisture in the air introduced from the heat exchange guide 330 and the condenser which reheats the dehumidified air are provided side by side. The heat exchange module 300 may be extended in a linear shape from the front to the rear of the lower frame 120. A side surface of the heat exchange module 300 is covered by a partition housing 340 connecting the heat exchange guide 330 to a circulation fan installation part 350, which will be described below. An upper portion of the heat exchange module 300 may be covered by a base cover 400 to be cut off from the outside. Reference numbers 410 and 450 indicate two components constituting the base cover 400.

Through the circulation flow path provided as described above, the high temperature and dry air provided from the heat pump system dries the clothing to be processed in the drum 200. The humid air that obtains moisture while drying clothing to be processed is supplied again into the heat pump system in a state of losing debris while passing through the filter assembly 500, thereby repeating the circulated operation.

Next, the configuration of the filter assembly 500 will be described below. The filter assembly 500 is positioned between the drum 200, which is the processing module, and the guide duct 310, and collects debris in the circulated air and then discharges the collected debris toward the guide duct 310. The filter assembly 500 is detachably supported by the filter holder 160 that is positioned between the drum 200, which is the processing module, and the guide duct 310. The filter assembly 500 includes the inner filter 510 and an outer filter 550 that are overlappingly assembled with each other, and serves to remove debris contained in the circulated air and then to supply the circulated air to the guide duct 310.

Based on a flowing structure of the circulated air, the filter assembly 500 is exposed upward through the filter holder 160 to receive the circulated air, and then filters debris in the circulated air and discharges debris downward and sideways. As shown in arrow ④ in FIG. 5, although the air introduced in the filter assembly 500 is discharged downward, but may be discharged to the side of the filter assembly 500. The side of the filter assembly 500 is covered by the guide duct 310 so that the air is discharged downward as a result.

As described above, since the circulated air loses debris while passing through the filter assembly 500, it is important to introduce the circulated air into the filter assembly 500. In the present disclosure, a sealing member 580 is provided to prevent the circulated air from escaping through the gap between the filter assembly 500 and the filter holder 160 or a gap between the inner filter 510 and the outer filter 550 that constitute the filter assembly 500 without passing through the inside of the filter assembly 500. The sealing member 580 may be regarded as a part of the filter assembly 500.

In FIG. 3, the filter assembly 500 is shown as a state of being separated from the filter holder 160. A user separates the filter assembly 500 from the filter holder 160 and then removes debris collected in the filter assembly 500. In the filter assembly 500, a mesh (M), which is a dense mesh, is provided, and the mesh (M) passes the circulated air, but collects debris. For reference, after FIG. 3, the filter assembly 500 is shown as a state in which the mesh (M) is removed from the filter assembly 500 for understanding of the structure of the filter assembly 500.

The filter holder 160 has a filter storage space 162 penetrated vertically and receiving the filter assembly 500 therein. A holding end 163 is provided at an edge of the filter storage space 162, and the filter assembly 500 may be locked and fixed by the holding end 163. The filter storage space 162 is extended lengthily in a longitudinal direction of the filter holder 160, wherein an opening of a roughly rectangular shape is provided when looking at the filter storage space 162 in a plan view, and the holding end 163 is provided along an edge of the opening.

Since the filter storage space 162 is connected to the guide duct 310 at a lower side thereof, and as a result, the circulated air is discharged through a lower side of the guide duct 310 (in a direction of arrow ④ in FIG. 3). More precisely, the circulated air passing through the filter assembly 500 is collected in the guide duct 310 to be guided downward. Meanwhile, the filter holder 160 itself may be separated from the front supporter 150.

Figure 4:
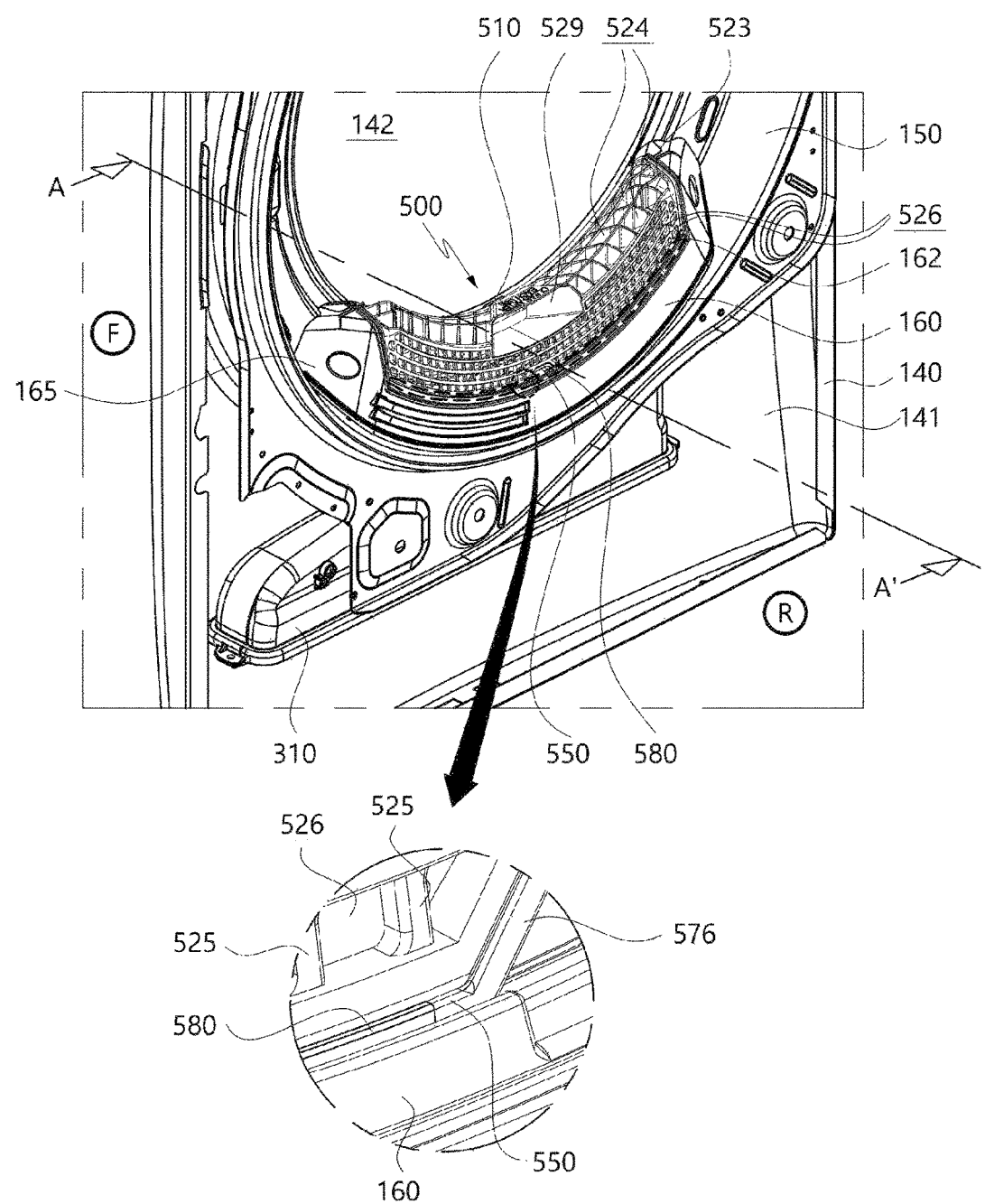
FIG. 4 is a perspective view showing a rear structure of the front frame shown in FIG. 3 in detail.

As shown in FIG. 4, it is shown that the filter assembly 500 is coupled to the filter holder 160. The filter assembly 500 and the filter holder 160 are configured to be fundamentally in close contact with each other, but the filter assembly 500 and the filter holder 160 are not integrally formed into a single body, thus the gap may be formed therebetween. The circulated air flowing into the gap may be guided into the guide duct 310 without passing through the filter assembly 500, so it is necessary to prevent the above problem. In FIG. 4, a dotted circle shows the gap between the filter assembly 500 and the filter holder 160, and the portion in the dotted circle is a part of a portion to be shielded by the sealing member 580.

As shown in the enlarged view in FIG. 4, it is shown that the sealing member 580 is fitted between the outer filter 550 constituting the filter assembly 500 and the holding end 163 of the filter holder 160 where the outer filter 550 is seated. The sealing member 580 is naturally compressed between the outer filter 550 and the holding end 163 during a process in which the filter assembly 500 is coupled to the filter holder 160. The sealing member 580 is provided to seal the gap between the inner filter 510 and the outer filter 550 constituting the filter assembly 500, and this part will be described again below.

Figure 5:
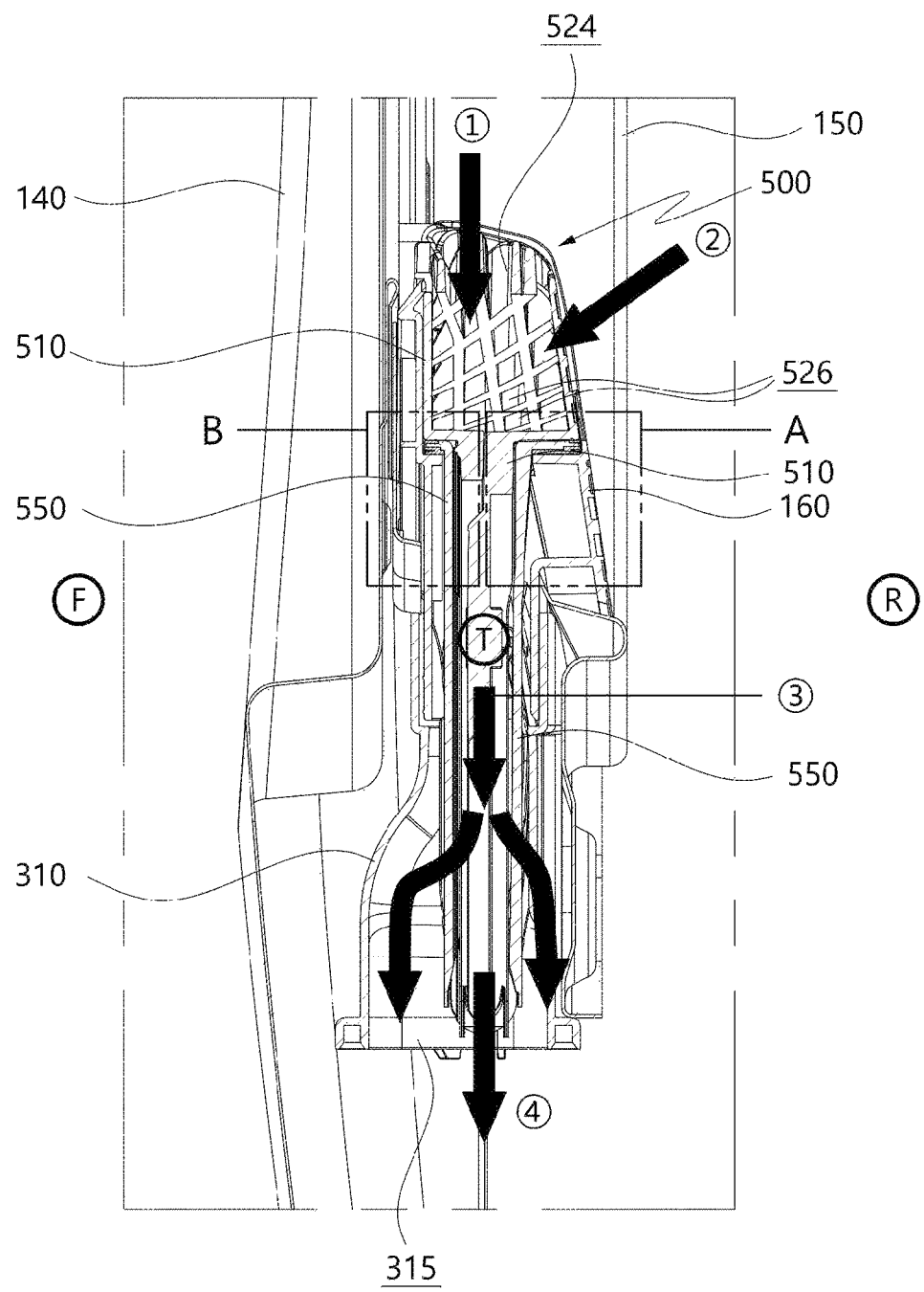
FIG. 5 is a section view taken along line A-A' shown in FIG. 4.

In FIG. 5, it is shown that the circulated air passes through the filter assembly 500. The circulated air discharged from the drum 200 and is introduced into the filter assembly through an upper portion of the filter assembly 500, that is, through an upper portion of a filter head 520 of the inner filter 510 that protrudes relatively higher and through a side portion thereof. The filter head 520 of the inner filter 510 constituting the filter assembly 500 is open in vertical and lateral directions so that the circulated air may be introduced from the top (in direction of arrow ①) and the side (in direction of arrow ②) of the filter head 520.

The circulated air passes through a filtration space (T) of the filter assembly 500 and then through the mesh (M) as shown in a direction of arrow ③ to be discharged downward or laterally. As shown in a direction of arrow ④, some of the circulated air is discharged laterally to be introduced into the guide duct 310, and some of the circulated air is discharged moves downward directly to be discharged through a lower end 315 of the guide duct 310. The circulated air may pass through the mesh (M) even when the circulated air is discharged in any direction. At this time, the inner filter 510 and the outer filter 550 have meshes (M), respectively, so that foreign substrate filtering is performed doubly.

Figure 6:
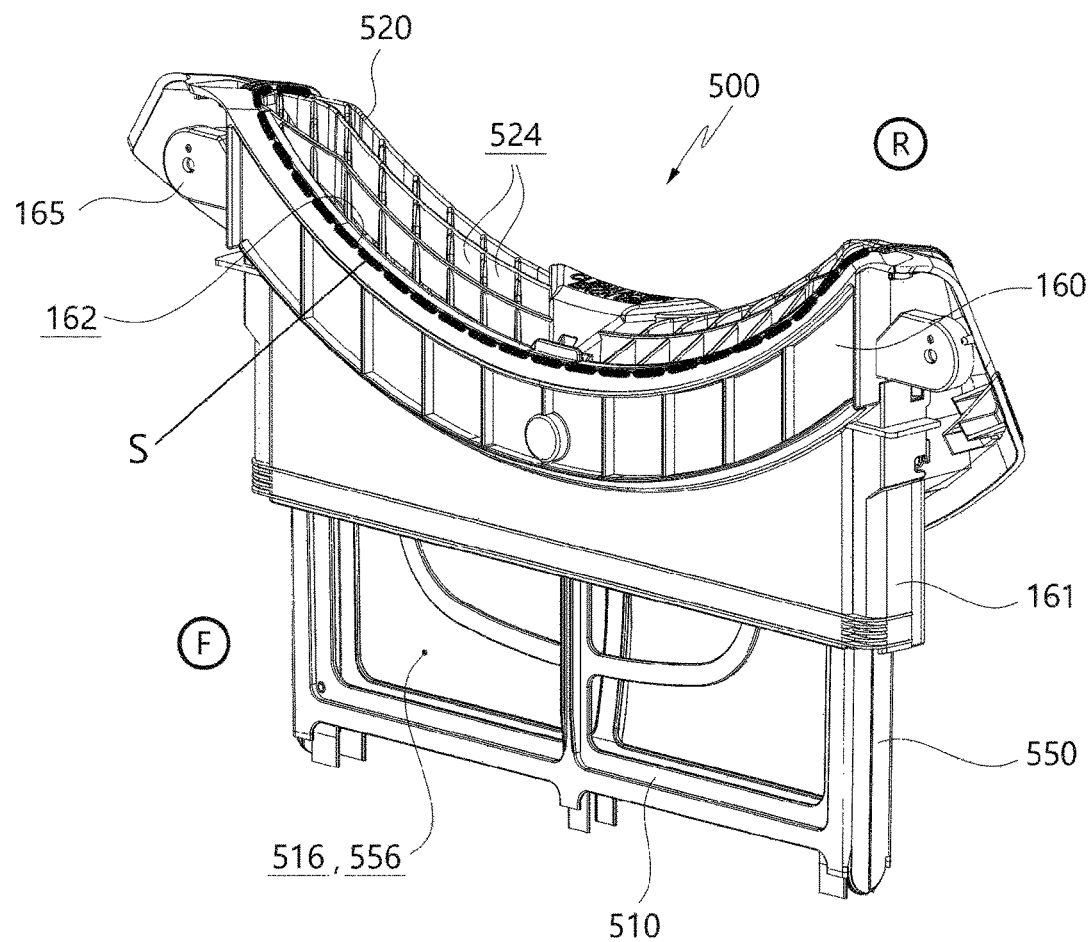
FIG. 6 is a perspective view separately showing a structure of a filter frame and a filter holder in which the filter frame is provided that constitute the embodiment of the present disclosure.

In FIG. 6, only the filter assembly 500 and the filter holder 160 are shown. When the filter assembly 500 is mounted in the filter holder 160, a lower side of the filter assembly 500, that is, a main body of the filter assembly 500 where the mesh (M) is inserted is exposed under the filter holder 160. The exposed portion is covered by the guide duct 310, so that the circulated air discharged through the mesh (M) may be finally supplied downward along the guide duct 310. In other words, the filter holder 160 holds only the upper portion of the filter assembly 500 so as not to interfere with the discharge of the circulated air filtered by the filter assembly 500. A dotted line (S) in FIG. 6 indicates the gap between the filter assembly 500 and the filter holder 160, and is also a part of the portion to be shielded by the sealing member 580.

Figure 7:
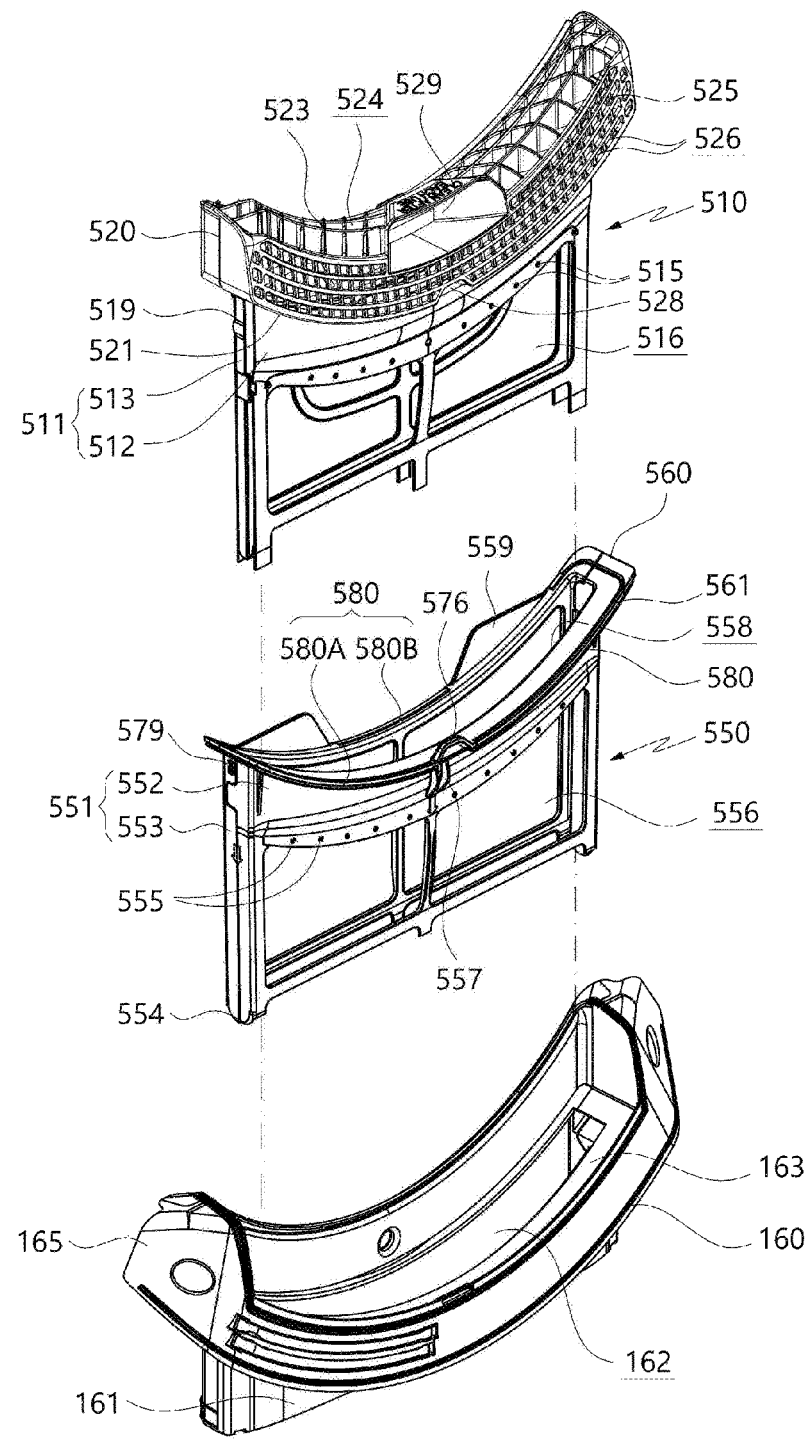
FIG. 7 is an exploded-perspective view showing the components shown in FIG. 6.

As shown in FIG. 7, it is shown that the filter assembly 500 and the filter holder 160 are disassembled with each other. First, in a structure of the filter holder 160, a frame of the filter holder 160 is formed of a short duct-shaped holding body 161 that is extended downward, and a holding head 165 is positioned on the holding body 161. The holding head 165 is a portion fixed to the front supporter 150, and the filter storage space 162 passing through the holding body 161 in the vertical direction is open upward at the holding head 165.

The holding end 163 on which the filter assembly 500 is mounted is formed in a curved surface at an edge around the filter storage space 162. The holding end 163 covers the filter storage space 162, thus the holding end 163 may be formed in various shapes in response to a shape of the filter storage space 162. The holding end 163 is formed to have an area and a shape corresponding to a seating end 560 of the outer filter 550, and when the filter assembly 500 is seated thereon, the holding end 163 may have a uniform shape with the filter assembly 500. In the embodiment, the holding end 163 has a roughly arced shape when viewed from the front of the apparatus.

Looking at the inner filter 510, a frame of the inner filter 510 is formed of a roughly rectangular framed inner body 511 and the filter head 520 connected to an upper portion of the inner filter 510. The inner body 511 includes the first inner body 512 and the second inner body 513 that are separated from each other, and the filtration space is positioned between the first inner body 512 and the second inner body 513. The first inner body 512 and the second inner body 513 may have a structure of being connected to each other and folded and unfolded, and FIG. 7 depicts a folded state thereof. The first inner body 512 and the second inner body 513 may be separate objects from each other.

The mesh (M) is coupled to each of a side surface and a lower surface of the inner body 511 to cover the filtration space, and reference numeral 515 indicates a fixing protrusion 515 provided for fixing the mesh (M). One of the meshes (M) coupled to the inner filter 510 constitutes a dual filter together with one of the meshes (M) connected to the outer filter 550, and the two meshes (M) may have different hole sizes from each other. For example, when the mesh (M) of the outer filter 550 has a smaller hole size than the mesh (M) of the inner filter 510, relatively large debris may be caught in the inner filter 510 and relatively small debris may be caught in the outer filter 550. The hole sizes may be variously modified without harming air permeability of the filters. The meshes (M) may be formed of a material, such as fiber, synthetic resin, or metal, and may be a stainless steel network or a carbon fiber network for strength reinforcement.

Reference numeral 516 is an inner filtration hole 516 that is an empty space before the mesh (M) is provided therein, the inner filtration hole 516 is provided at each of the first inner body 512 and the second inner body 513, and is also provided at each of lower sides of the first inner body 512 and the second inner body 513. Accordingly, the mesh (M) may be provided across the inner filtration hole 516 in the foam of blocking a side surface and a lower portion of the inner filter 510.

A locking protrusion 519 protrudes from the side surface of the inner body 511 to be caught by an inside surface of the outer filter 550, and the filter head 520 is provided above the locking protrusion 519. The filter head 520 protrudes in all directions (back and forth, and left and right) from the inner body 511, thus a lower surface 521 of the filter head 520 may be seated on the holding end 163 of the filter holder 160, with the seating end 560 of the outer filter 550 between the filter head 520 and the filter holder 160. That is, the filter head 520 serves as an inlet through which the circulated air is introduced, and allows the inner filter 510 to be locked by the holding end 163.

An upper inlet 523 is provided at the upper portion of the filter head 520 and upper holes 524 penetrate the upper inlet 523 at intervals. A side inlet 525 is provided at the side of the filter head 520 and side holes 526 penetrate the side inlet 525 at intervals. The upper inlet 523 and the side inlet 525 are configured such that, a plurality of ribs that are disposed across each other forms a grill shape. All the upper hole 524 and the side holes 526 are formed in rectangular shapes in the embodiment, but may have polygonal shapes or circular shapes and may not be limited in size. The upper holes 524 and the side holes 526 occupy most area of the filter head 520 to allow the circulated air to be introduced smoothly into the filter head 520.

The filter head 520 has a first assembly part 528, and the first assembly part 528 is formed at a side of the filter head 520 and, more precisely, is formed in a shape in which a part of the filter head 520 is recessed from the rear of the filter head 520 facing the inside of the laundry processing apparatus 100. The first assembly part 528 may be assembled with a second assembly part 576 formed in the seating end 560 of the outer filter 550, which will be described below, to prevent misassembly and may serve as a small recessed handle 529.

The filter head 520 has the handle 529. The handle 529 is formed such that, an upper portion of the filter head 520 is partially recessed inward. The user can grip the handle 529 and pull the filter assembly 500 from the filter holder 160. The handle 529 is provided at the rear of the filter head 520 facing the inside of the laundry processing apparatus 100, so the handle 529 may not be seen accurately from the front of the laundry processing apparatus.

Figure 11:
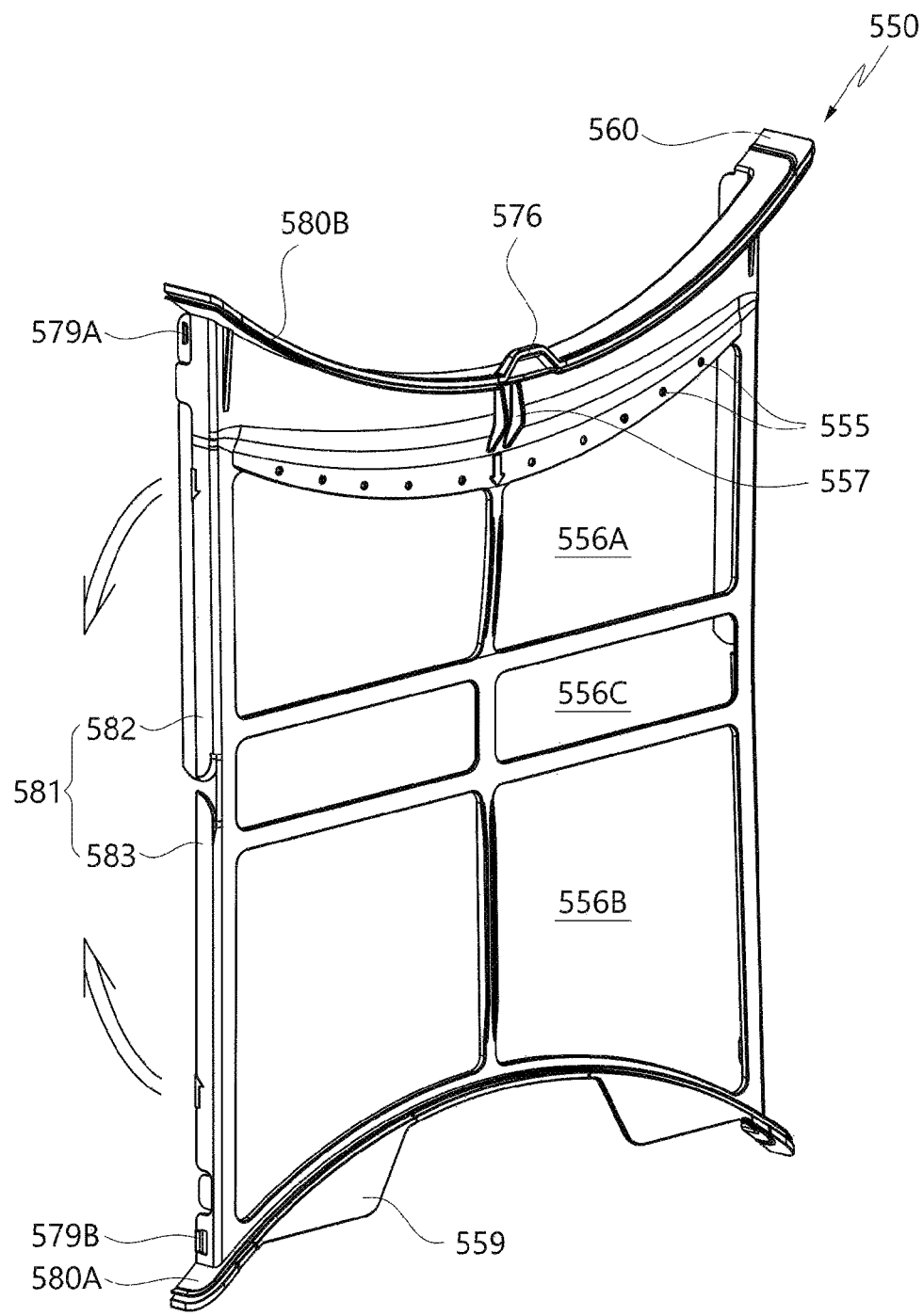
FIG. 11 is a perspective view showing the outer filter constituting the embodiment of the present disclosure, the outer filter being in an unfolded state.

Next, looking at the outer filter 550, the outer filter 550 is assembled with the inner filter 510 to provide the dual filter, and is inserted into the filter storage space 162 of the filter holder 160. The outer filter 550 has a similar shape to the inner filter 510 in order to receive the inner filter 510, but a filtration space in the outer filter 550 is larger than the inner body 511 of the inner filter 510. An outer body 551 forming a frame of the outer filter 550 is also formed in a roughly rectangular frame shape, like the inner body 511, and includes a first outer body 552 and a second outer body 553, which are separated from each other. Further, the filtration space is provided between the first outer body 552 and the second outer body 553. The first outer body 552 and the second outer body 553 may be connected to each other in a structure of being folded or unfolded. In FIG. 7, it is shown that the first outer body 552 and the second outer body 553 are folded centering around a hinge part 554 at a lower side of the outer body. In FIG. 11, it is shown that the first outer body 552 and the second outer body 553 are in the unfolded state.

The mesh (M) is coupled to each of a side surface and a lower surface of the outer body 551 to cover the filtration space of the outer filter 550. Reference numeral 555 indicates a fixing protrusion 555 provided for fixing the mesh (M). The mesh (M) coupled to the outer filter 550 constitutes the dual filter together with the mesh (M) coupled to the inner filter 510, and as described above, hole sizes of the two meshes (M) may be different from each other. The meshes (M) may be formed of a material, such as fiber, synthetic resin, or metal, and may be a stainless steel network or a carbon fiber network for strength reinforcement.

Reference numeral 556 is an outer filtration hole 556 that is an empty space before the mesh (M) is provided therein, the outer filtration hole 556 is provided at each of the first outer body 552 and the second outer body 553, and at each of lower sides of the first outer body 552 and the second outer body 553. Accordingly, the mesh (M) may be provided across the outer filtration hole 556 in the form of blocking a side surface and a lower portion of the outer filter 550. As shown in FIG. 11, the outer filtration hole 556 may be classified into a first outer filtration hole 556A provided in the first outer body 552, a second outer filtration hole 556B provided in the second outer body 553, and a third outer filtration hole 556C provided between the first outer body 552 and the second outer body 553. The filtering holes are all covered with the meshes (M).

At the side surface of the outer body 551, an assembly means 579 for assembling the first outer body 552 and the second outer body 553 is provided. Referring to FIG. 11, the assembly means 579 may include an assembly piece 579A provided in the first outer body 552 and an assembly hook 579B provided in the second outer body 553. The assembly means 579 may also be formed differently from the above structure, for example, the assembly means 579 may be variously modified, such as assembly by separate fastenings, forcibly fitted structure, a clip structure, or the like. Non-described reference numeral 557 is a spacer that allows an outside surface of the outer filter 550 to be spaced apart from an inside surface of the filter storage space 162 of the filter holder 160.

As shown in FIG. 7, the seating end 560 protrudes from an upper portion of the outer body 551 of the outer filter 550. The seating end 560 may protrude in all direction (back and forth, and left and right) from the outer body 551 to be seated on the holding end 163 of the filter holder 160. The seating end 560 has a thin eave structure that protrudes around an edge of an insert hole 558 in the center of the outer filter 550. The seating end 560 is caught on the holding end 163 by having a protruding shape, for this purpose, the holding end 163 and the seating end 560 have shapes and sizes corresponding to each other.

The seating end 560 is coupled to the sealing member 580. The sealing member 580 is provided for sealing the gap between the filter assembly 500 and the filter holder 160 (referring to a direction of arrow ⑤ in FIGS. 8 and 9) and the gap between the outer filter 550 and the inner filter 510 (referring to a direction of arrow ⑥ in FIGS. 8 and 9), and a one sealing member 580 may perform all of the above roles. Herein, the sealing means to block a gap so that the circulated air does not pass through the gap. As will be described below, in the embodiment, the sealing member 580 is formed integrally with the seating end 560 of the outer filter 550, but may be assembled in a detachable form.

Figure 12:
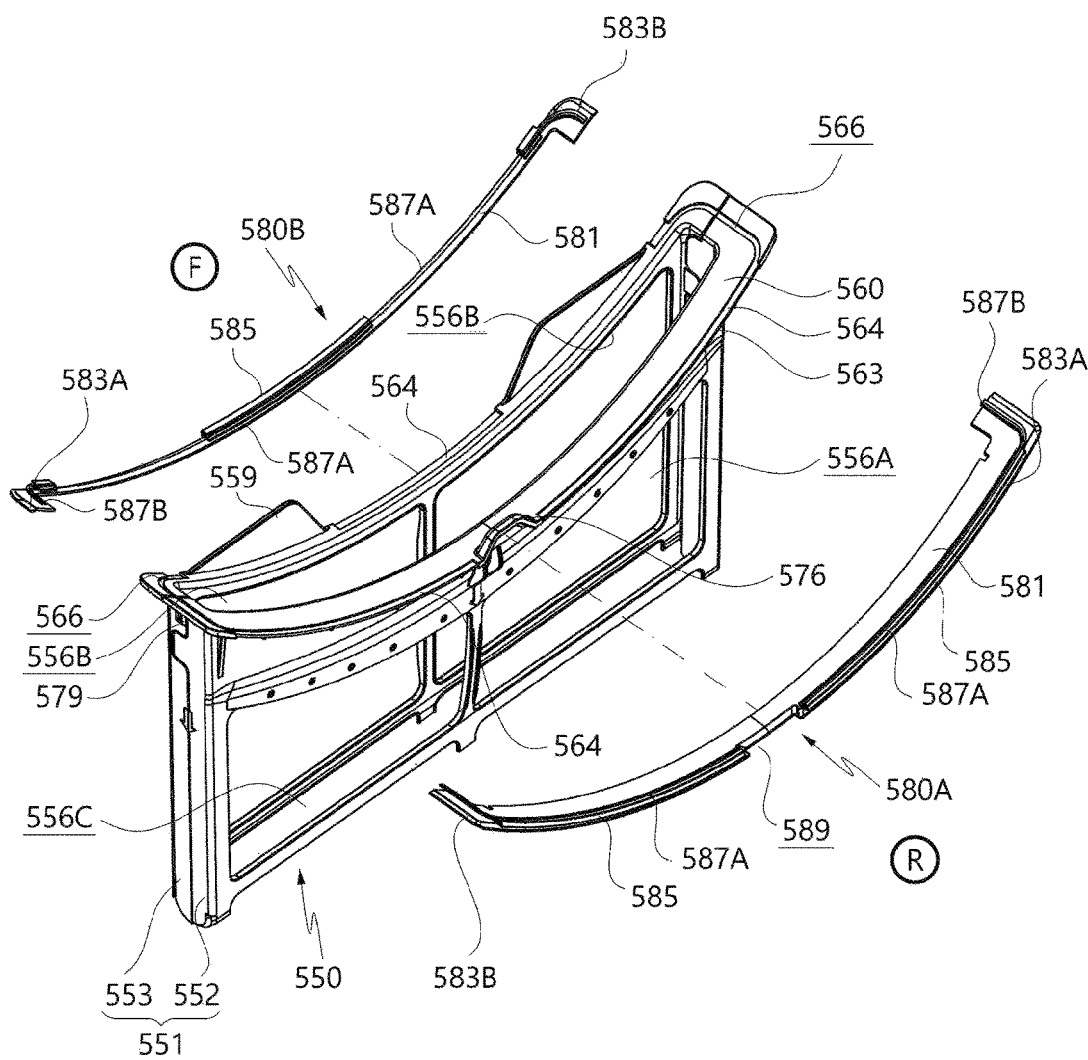
FIG. 12 is a perspective view showing the outer filter constituting the embodiment of the present disclosure, the outer filter being in a state in which a sealing member is separated therefrom.
Figure 15:
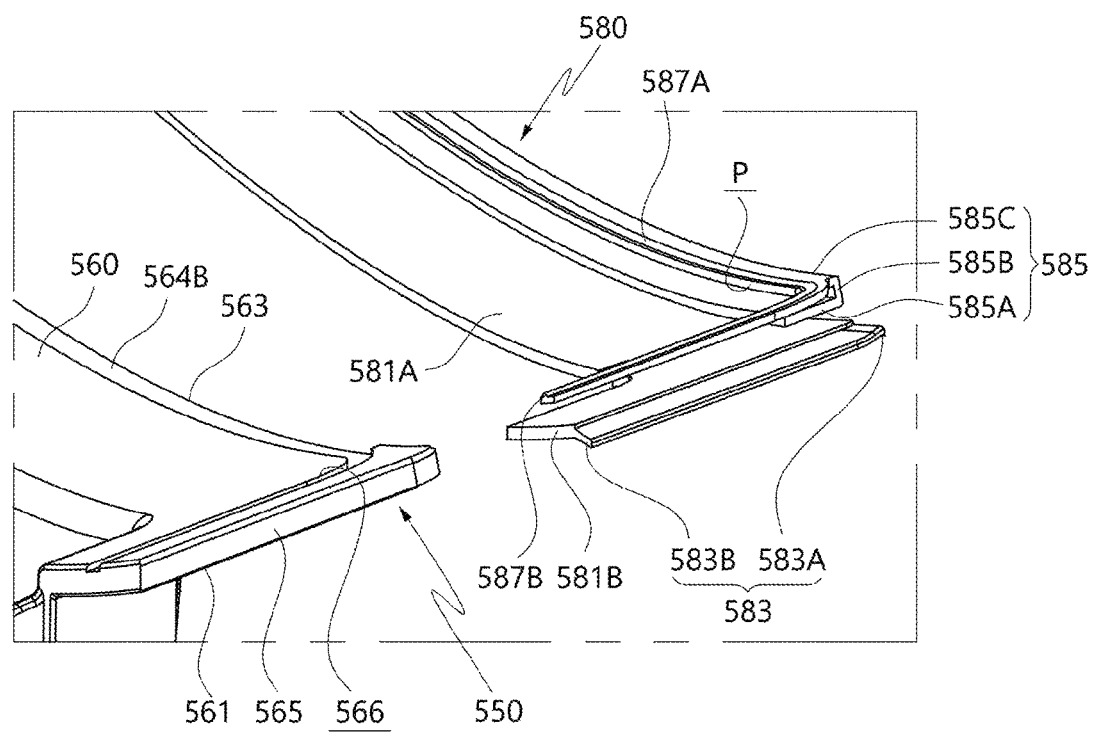
FIG. 15 is a perspective view showing a partial structure of the outer filter and the sealing member that constitute the embodiment of the present disclosure, the view being taken from a different angle from FIG. 13.

For better view of a structure of the seating end 560, in FIGS. 12 and 15, it is shown that the sealing member 580 is separated from the seating end 560. Herein, the seating end 560 is classified into a first seating end 563 protruding inward and outward with respect to the drum, and a second seating end 565 protruding perpendicular to the first seating end 563. The first seating end 563 and the second seating end 565 are connected to each other, but they are classified by positions of the seating ends.

The first seating end 563 has a stepped surface 564. The stepped surface 564 is a portion where the thickness of a portion of an end of the first seating end 563 is thin. Since the thickness of the stepped surface 564 is thin, even when the sealing member 580 is coupled thereto, the overall thickness of the first seating end 563 is prevented from being increased due to the thickness of the sealing member 580.

Figure 14:
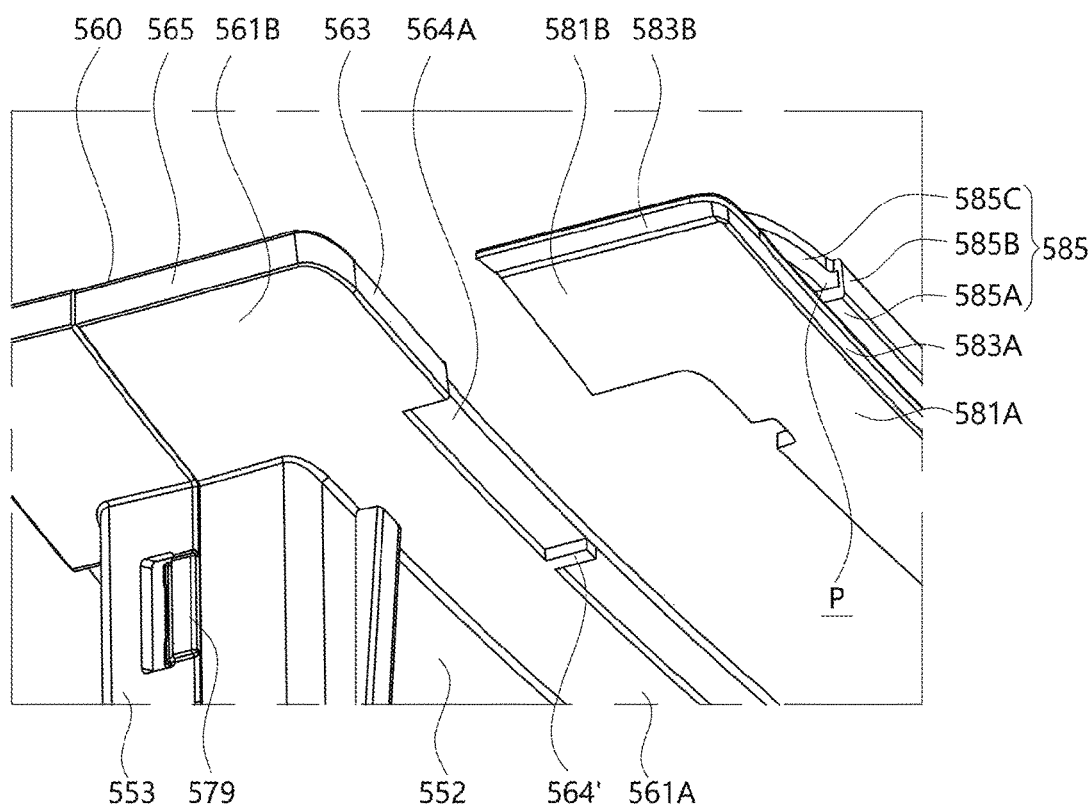
FIG. 14 is a perspective view showing a partial structure of the outer filter and the sealing member that constitute the embodiment of the present disclosure, the view being taken from a different angle from FIG. 13.

More precisely, the stepped surface 564 may be classified into a lower stepped surface 564A and an upper stepped surface 564B. In FIG. 14, the lower stepped surface 564A coupled to a lower surface coupling plate 585A of a connector 585 of the sealing member 580, which will be described below, is provided at a lower surface of the first seating end 563. Further, the upper stepped surface 564B is provided at an upper surface of the first seating end 563, which corresponds to the opposite surface of the lower stepped surface 564A, and an upper surface coupling plate 585C of the connector 585 is coupled thereto. The stepped surface 564 prevents the sealing member 580 from protruding in a direction of the holding end 163 of the filter holder 160 at the lower side of the outer filter and in a direction of the lower surface of the filter head 520 of the inner filter 510 at the upper side of the outer filter. In the embodiment, the stepped surface 564 is provided at only the first seating end 563, but the stepped surface 564 may be provided in the second seating end 565.

As shown in FIG. 14, a lower surface 561 of the seating end 560 has a coupling rib 564'. More precisely, the coupling rib 564' protrudes from the lower surface of the first seating end 563, and the protruding coupling rib 564' serves to increase the coupling force between a portion of an outer edge of the first seating end 563 and an inner surface of a pocket (P) of the sealing member 580, which will be described below. A plurality of coupling ribs 564' may be disposed with an interval from each other, and in the embodiment, the coupling rib 564' is extended in a coupling direction between the outer filter 550 and the sealing member 580.

In FIGS. 12 and 15, the second seating end 565 has an assembly slot 566. The assembly slot 566 is formed in a shape of being depressed on an upper surface of the second seating end 565, and a part of the upper surface coupling plate 585C that is branched from the connector 585 of the sealing member 580 is inserted into the assembly slot 566. In the embodiment, the assembly slot 566 is extended along the second seating end 565, but is not extended to the first seating end 563. The assembly slot 566 may be omitted and the sealing member 580 is directly assembled with an outer surface of the second seating end 565.

As described above, the seating end 560 of the outer filter 550 has the protruding shape and includes the lower stepped surface 564A, the upper stepped surface 564B, and the assembly slot 566, so that the sealing member 580 may be coupled to the seating end 560. The sealing member 580 may be formed of various materials capable of the airtight function, such as rubber, silicone, and synthetic resin of elastic materials. The sealing member 580 is provided in the separable filter assembly 500, not the filter holder 160 fixed in the laundry processing apparatus, in particular, the sealing member 580 is formed in a shape of covering the seating end 560 protruding from the filter assembly 500. Therefore, it is unnecessary to change the design of the laundry processing apparatus, and a structure that may be added to the existing laundry processing apparatus is provided, so that the product has high compatibility.

The sealing member 580 may be formed integrally with the outer filter 550 by one of coupling methods such as insert injection, thermal fusion, ultrasonic fusion, and laser fusion. In the embodiment, thermal fusion method is used. More precisely, the outer filter 550 is formed of a plasticity plastic material and the sealing member 580 is formed of thermoplastic styrenic elastomer material, and then the outer filter 550 and the sealing member 580 may be integrally formed with each other by fusion.

Herein, thermoplastic styrenic elastomer material (hereinbelow, it is referred to as 'TPS') is composed of a polystyrene segment and an elastomer segment having a flexible polyolefin structure, and it is preferable that hardness (Shore A) is between 40 to 70. Among them, polystyrene segment has properties similar to those of elastomer segment of the outer filter 550, so that the sealing member 580 and the outer filter 550 may be welded to each other. In the embodiment, the outer filter 550 is formed of polypropylene (PP) having a high fusion point, so that fusion operation may be performed at a high temperature between 180° to 210°.

Looking at the structure of the sealing member 580, the sealing member 580 is formed of one material in which parts are connected to each other. More precisely, as shown in FIG. 12, the sealing member 580 is assembled with each of the first outer body 552 and the second outer body 553 that constitute the outer filter 550. A sealing member 580A assembled with the first outer body 552 is formed of a single body, and a sealing member 580B assembled with the second outer body 553 is formed of a single body.

The One sealing member 580 may seal both the gap between the filter assembly 500 and the filter holder 160 and the gap between the inner filter 510 and the outer filter 550. The sealing member 580 is provided to cover at least a part of the outer surfaces of the outer filter 550 that is assembled with the filter holder 160 to seal the gap between the outer filter 550 and the filter holder 160, and a part of the sealing member 580 protrudes toward the inner filter 510 to seal the gap between the inner filter 510 and the outer filter 550. A specific structure for the above description will be described in detail below.

First, the sealing member 580 has an elongated structure, and has a shape suitable for the seating end 560 of the outer filter 550 so as to be integrally coupled to the seating end 560 of the outer filter 550. As described above, the sealing member 580 may be coupled to the outer filter 550 by the thermal fusion method, and in the embodiment, the sealing member 580 has a pocket structure so as to be fitted in an edge of the seating end 560. Unlikely, instead of the thermal fusion method, it is possible to couple the sealing member 580 to the outer filter through insert injection or adhesive.

As shown in FIG. 12, the sealing members 580 are respectively assembled with the first outer body 552 and the second outer body 553, and shapes of the two sealing members (580A and 580B) are slightly different from each other. This is because the first outer body 552 and the second outer body 553 have different shapes. For example, the first outer body 552 has the second assembly part 576 protruding from the first outer body 552, which should be avoided, and the second outer body 553 has the misassembled prevention piece 559, which should be avoided. Accordingly, the two sealing members (580A and 580B) have different portions from each other to fit an object to be assembled, but portions other than the different portions are formed of a similar structure.

Describing on the basis of the sealing member 580A assembled with the first outer body 552, the sealing member 580A has a base 581 extended lengthily, and the base 581 has a first sealing part 583 and a second sealing part 587. The base 581 is extended along a lower surface of the seating end 560 of the outer filter 550. The base 581 is coupled to the lower surface of the first seating end 563 in the seating end 560.

The base 581 is a portion for coupling to the seating end 560, thus has the largest area in the sealing member 580 for the stable coupling. The base 581 itself servers to seal, and the base 581 seals a gap between the outer filter 550 and the holding end 163 of the filter holder 160. For reference, for distinguishment, reference numeral 581A is assigned to a base coupled to the first seating end 563 in the seating end 560 and reference numeral 581B is assigned to a base coupled to the second seating end 565.

The base 581 is connected to the first sealing part 583. The first sealing part 583 is extended in a downward inclined direction while protruding outward from one end of the base 581. As a result, the first sealing part 583 protrudes toward the holding end 163 of the filter holder 160, this is for the first sealing part 583 to be elastically transformed while being naturally pressed by the holding end 163 when the filter assembly 500 is held by the filter holder 160, thereby increasing airtightness.

Figure 16:
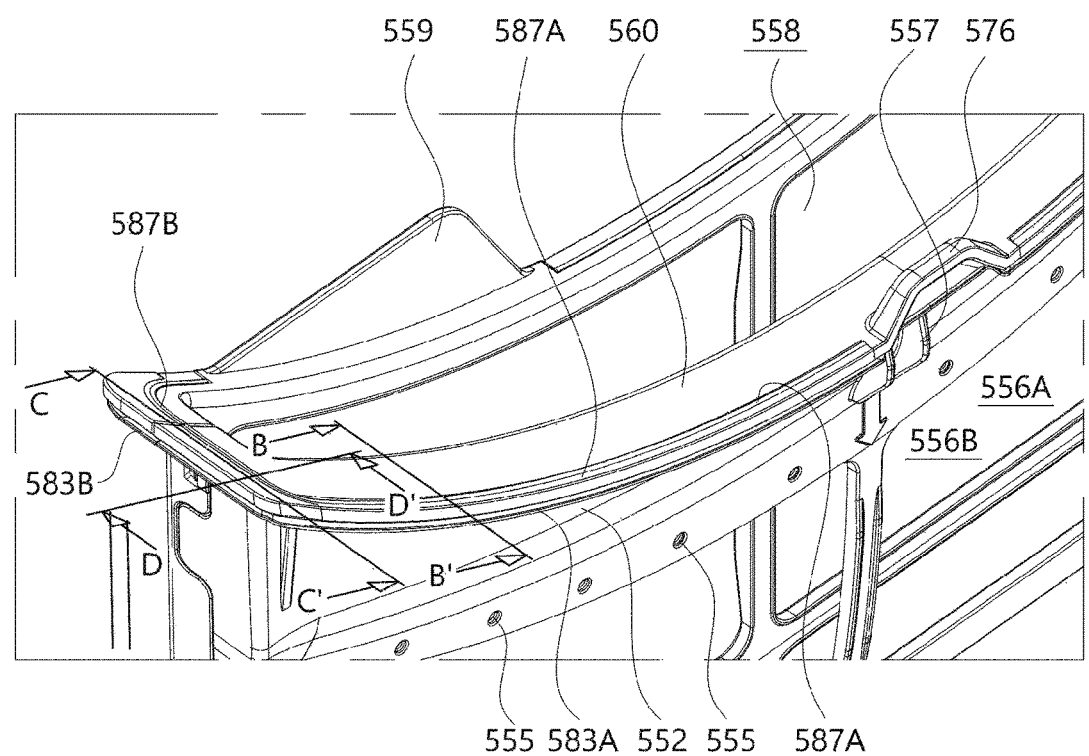
FIG. 16 is an enlarged-perspective view showing a coupling portion between the outer filter and the sealing member in FIG. 10.

As shown in FIG. 16, the first sealing part 583 is formed by covering the entire seating end 560 of the outer filter 550, and a first sealing part 583A provided in the first seating end 563 and a first sealing part 583B provided in the second seating end 565 may be continuously connected to each other without breaking to improve the sealing performance. The second sealing part 587 is also formed in a portion except an avoidance part 589 formed due to the second assembly part 576. That is, both the first seating end 563 and the second seating end 565 have the second sealing part 587 protruding. For reference, in the drawings, reference numeral 587A is assigned to a second sealing part connected to the first seating end 563, and reference numeral 587B is assigned to a second sealing part connected to the second seating end 565, for distinguishment.

Figure 17:
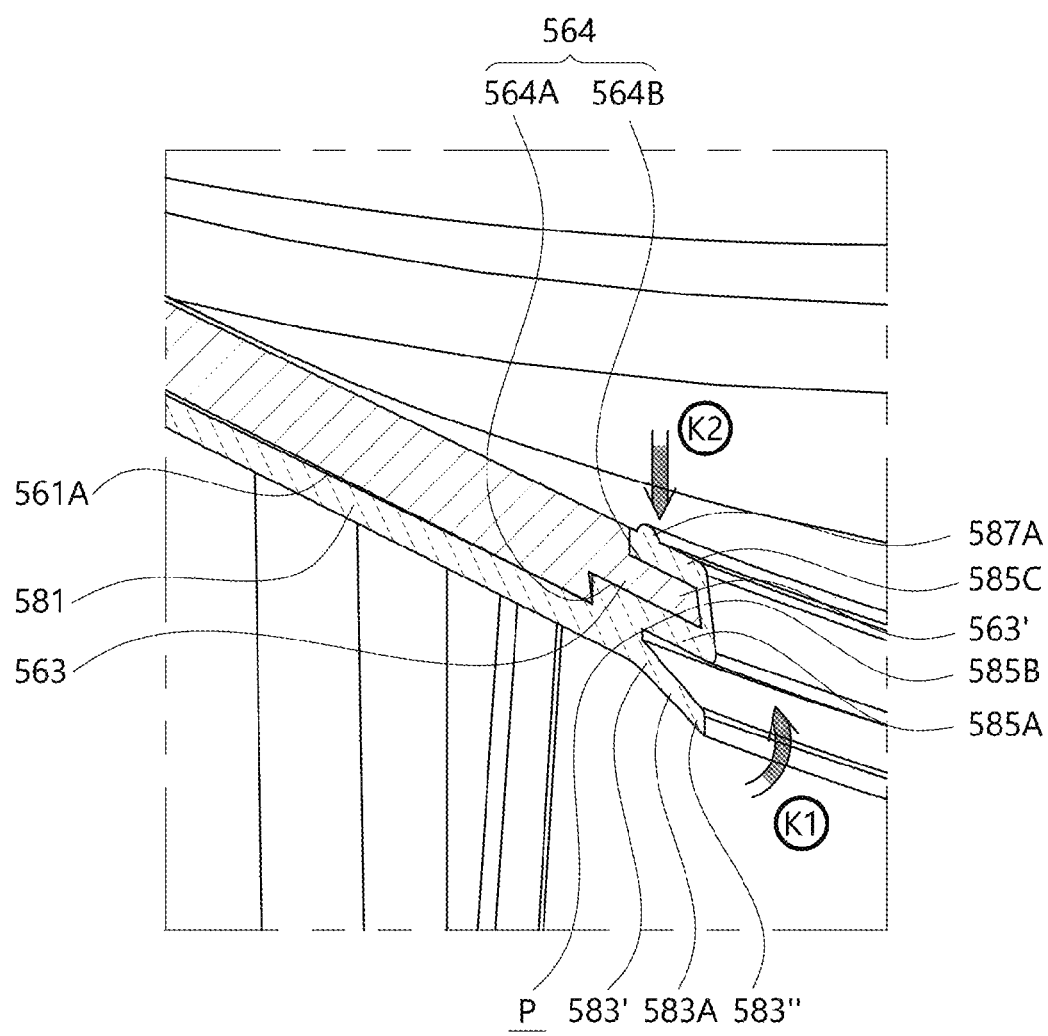
FIG. 17 is a section view taken along line B-B' in FIG. 16.

Referring to FIG. 17 for more clarity, which is a section view, the first sealing part 583 is gradually spaced apart from the lower surface of the seating end 560 of the outer filter 550 as the first sealing part 583 goes toward a protruding end 583". Further, the first sealing part 583 is configured such that the outer protruding end 583" thereof has a thickness thinner than an opposite end 583' thereof connected to the base 581. This is for increasing elasticity force of the first sealing part 583 and increasing strength of an upper portion of the connector 585 by thickening a portion where the first sealing part 583 is connected to the base 581. In FIG. 17, reference numeral K1 indicates a direction in which the first sealing part 583 is elastically deformed by being compressed by the holding end 163.

The first sealing part 583 is extended along the base 581, reference numeral 583A is assigned to the first sealing part 583 positioned at a lower surface side of the first seating end 563 of the outer filter 550, and reference numeral 583B is assigned to the first sealing part 583 positioned at a lower surface side of the second seating end 565. The first sealing parts 583A and 583B are connected to each other, so they may be seen as the one first sealing part 583.

Figure 18:
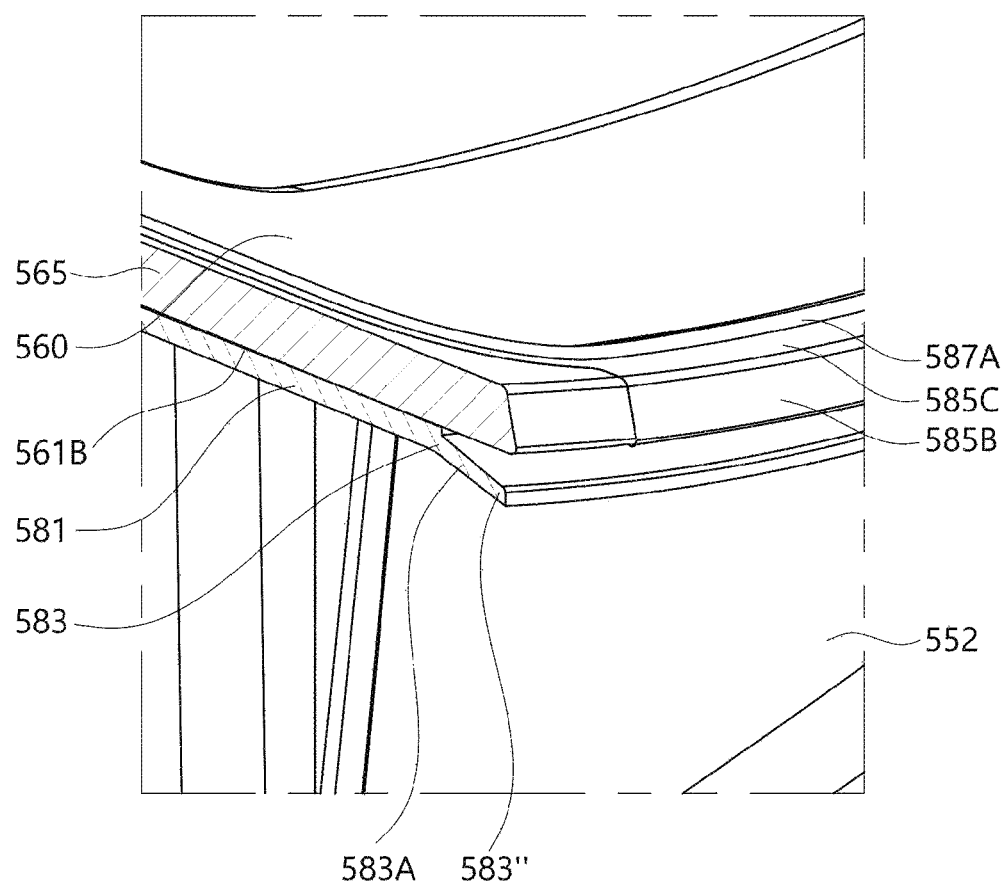
FIG. 18 is a section view taken along line C-C' in FIG. 16.
Figure 19:
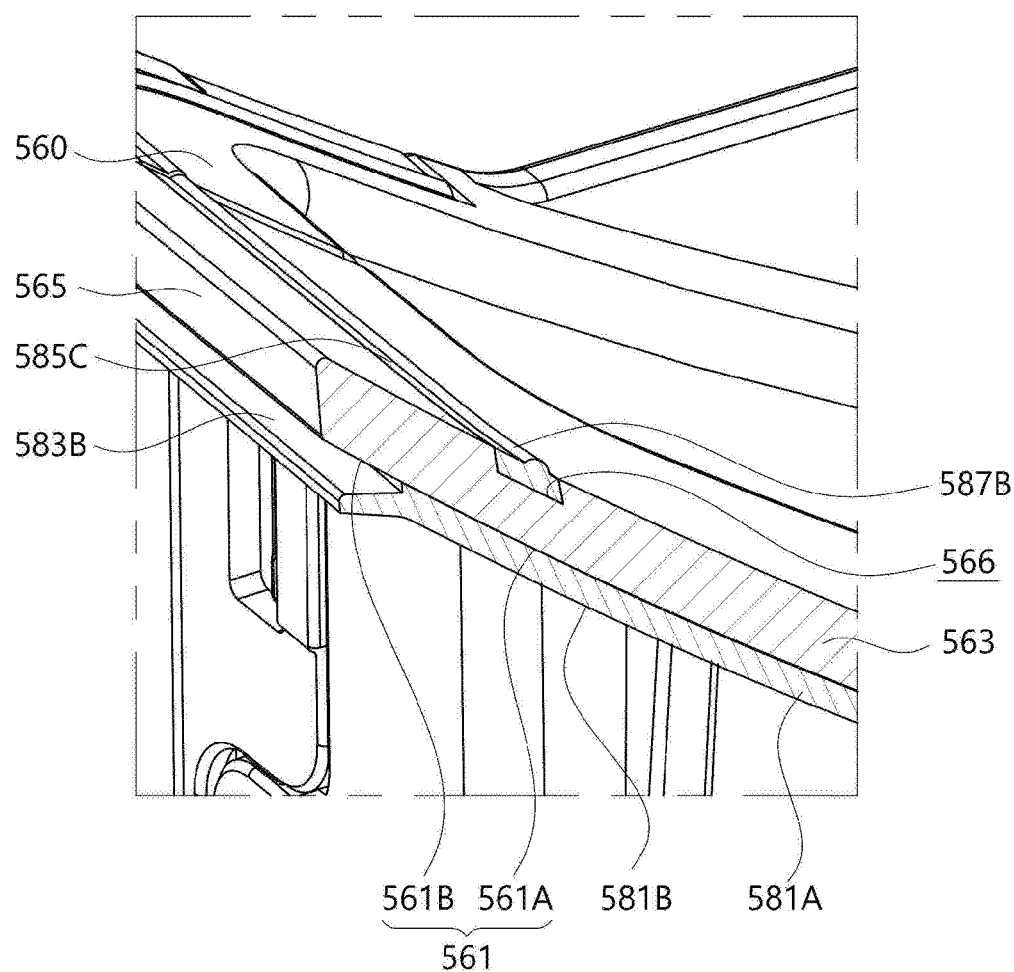
FIG. 19 is a section view taken along line D-D' in FIG. 16.

In FIG. 18, since the second seating end 565 is shown as a sectional structure, only the first sealing part 583 is shown in the section view, but it is shown that the second sealing part 587 is provided on the upper surface of the second seating end 565. FIG. 19 is a section view taken along line D-D' in FIG. 16, the first sealing part 583 provided in the second seating end 565 and the second sealing part 587 provided in the second seating end 565 are shown in different positions from each other, but they are actually connected. In FIG. 19, reference numeral 561A is assigned to a portion of the lower surface of the first seating end 563, in the lower surface of the seating end 560, and reference numeral 561B is assigned to a portion of a lower surface of the second seating end 565, for distinguishment of reference numeral.

Figure 8:
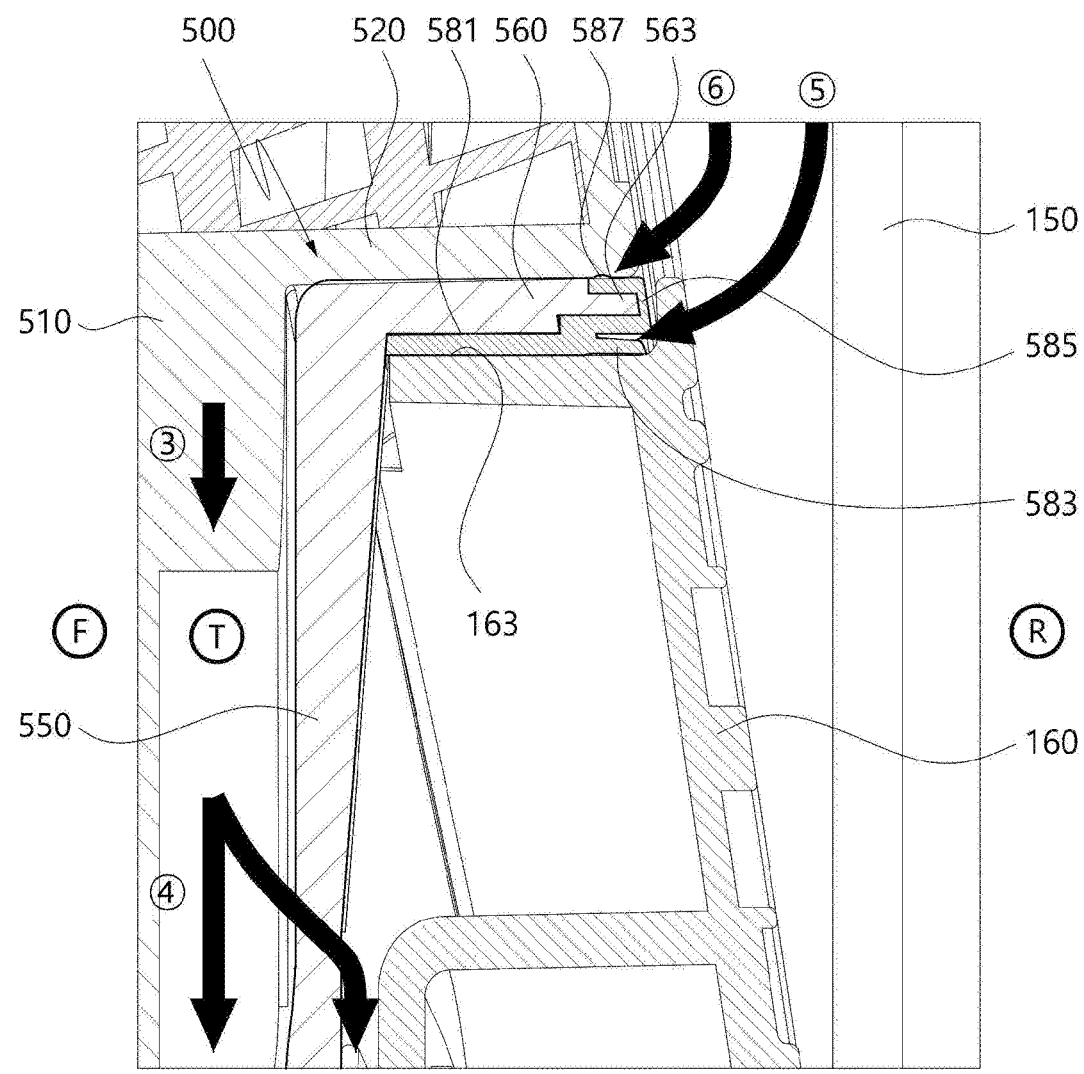
FIG. 8 is an enlarged view showing part A in FIG. 5.

In FIG. 8, which is an enlarged view of part A in FIG. 5, it is shown that the first sealing part 583 serves as sealing. The first sealing part 583 is elastically transformed upward by being compressed by the holding end 163 of the filter holder 160 to block a gap between the holding end 163 and the seating end 560 of the outer filter 550. The base 581 is also compressed between the outer filter 550 and the holding end 163 together with the first sealing part 583 to serve as sealing. The base 581 is extended across between the seating end 560 of the outer filter 550 and the holding end 163 to increase the airtightness. In addition, since the first sealing part 583 blocks the gap between the seating end 560 and the holding end 163 while being elastically transformed, the sealing performance may be improved. Therefore, inflow of the circulated air in a direction of arrow ⑤ may be prevented.

When the circulated air is introduced into the gap between the seating end 560 and the holding end 163, the circulated air is discharged through the lower side of the guide duct 310 without passing through the filter assembly 500, so that no debris is filtered. Therefore, at the portion (the gap), the base 581 and the first sealing part 583 cooperate to increase the airtightness and guide the circulated air to pass through the filtration space (T).

As shown in FIG. 8, the protruding end of the first sealing part 583 is extended only to a portion retracted inward than the connector 585 of the sealing member 580, which will be described below, or the edge of the seating end 560 toward the center of a filter mounting space (or the filtration space (T)) where the inner filter 510 is received. In other words, the end of the first sealing part 583 does not protrude than the connector 585 or the seating end 560. Accordingly, in the assembly or disassembly process of the filter assembly 500, the end of the first sealing part 583 may be prevented from interfering with the outside of the filter assembly 500.

Looking again at FIG. 12, the connector 585 is extended on the base 581 toward the opposite side to the first sealing part 583, and the connector 585 has the second sealing part 587. The connector 585 is extended from the base 581 and covers an outer edge of the seating end 560. More precisely, the connector 585 is coupled to the first seating end 563 in a form of covering the outer end of the first seating end 563. The second sealing part 587 protrudes from an outer surface of the connector 585 covering an upper surface of the seating end 560 toward the inner filter 510.

As described above, the first sealing part 583 and the second sealing part 587 are connected to each other through the connector 585, and there is no broken portion between the first sealing part 583 and the second sealing part 587.

Accordingly, the first sealing part 583 and the second sealing part 587 may be provided in the one sealing member 580, and as the circulated air flowing through the broken portion of the sealing member 580 is blocked, the airtightness may be improved.

Figure 13:
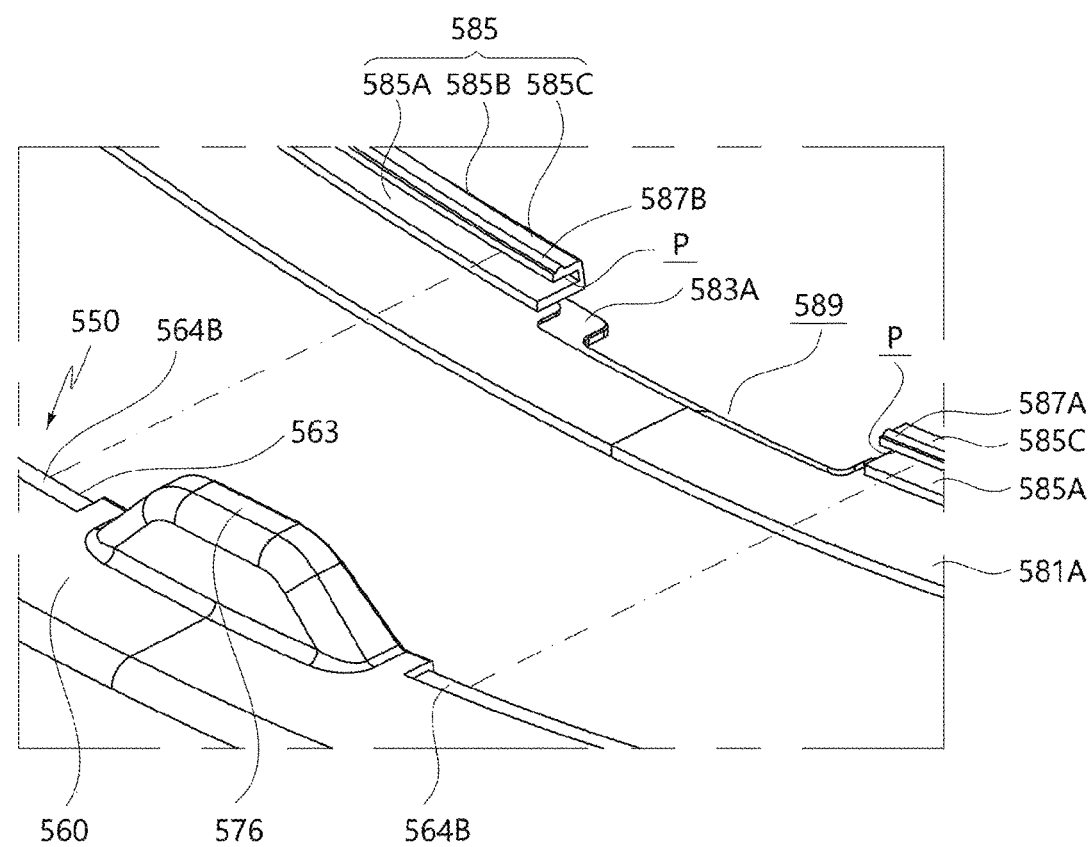
FIG. 13 is an enlarged-perspective view showing the sealing member of the outer filter constituting the embodiment of the present disclosure.

Looking at the structure of the connector 585 in detail with reference to FIG. 13, the connector 585 is configured such that the lower surface coupling plate 585A, a lateral surface coupling plate 585B, and the upper surface coupling plate 585C are connected to each other to form an approximately ' ⊂ ' shape. The lower surface coupling plate 585A is in close contact with the lower surface of the first seating end 563, the lateral surface coupling plate 585B is connected to the lower surface coupling plate 585A and covers a protruding lateral surface of the first seating end 563. The upper surface coupling plate 585C is connected to the lateral surface coupling plate 585B and is in close contact with the upper surface of the first seating end 563, and the second sealing part 587 protrudes from the upper surface coupling plate 585C.

Inside the connector 585 having the roughly ' ⊂ ' shape, the pocket (P) where a part (563', referring to FIG. 17) of the outer edge of the first seating end 563 is inserted is provided. The part 563' of the outer edge of the first seating end 563 is inserted in the pocket (P) to increase the coupling force and, more precisely, the stepped surface 564 of the first seating end 563 is inserted in the pocket (P). As described above, the coupling rib 564' is provided in the lower stepped surface 564A of the first seating end 563, so that coupling between the pocket (P) and the stepped surface 564 may be performed solidly.

Looking at the second sealing part 587, the second sealing part 587 is extended in a long shape along the lateral surface coupling plate 585B of the connector 585 to seal the gap between the outer filter 550 and the inner filter 510. Since the second sealing part 587 protrudes from an outer surface of the upper surface coupling plate 585C covering the upper surface of the seating end 560 toward the inner filter 510, so that the second sealing part 587 is compressed between the inner filter 510 and the outer filter 550 to perform the sealing function.

Looking at FIG. 8, the second sealing part 587 performs the sealing function between the inner filter 510 and the outer filter 550 and, more precisely, between the edge of the seating end 560 of the outer filter 550 and a lower side of the filter head 520 of the inner filter 510. The second sealing part 587 blocks the gap between the inner filter 510 and the outer filter 550 while being pressed by the elasticity, thereby blocking the circulated air introduced in a direction of arrow of ⑥. However, the circulated air introduced in the direction of arrow of ⑥, the circulated air passes through the mesh (M) of the outer filter 550, but not the mesh (M) of the inner filter 510, so that debris collection rate may be reduced.

As shown in FIG. 8, the second sealing part 587 is provided at the position retracted inward on the connector 585 of the sealing member 580 covering the lateral surface of the seating end 560 toward the center of the filter mounting space (or the filtration space (T)) where the inner filter 510 is received. That is, the second sealing part 587 is positioned at an inner portion of the connector 585, not the center thereof, this is for minimizing the inference between the second sealing part 587 and external structures due to the protruding structure of the second sealing part 587 by placing the second sealing part 587 inside.

In FIG. 17, the sectional shape of the second sealing part 587 is clearly shown. The second sealing part 587 is extended in a longitudinal direction of the connector 585 of the sealing member 580, and has a transverse section in which a protruding height is increased as the second sealing part 587 goes toward the center of the second sealing part 587. Therefore, the second sealing part 587 may be compressed downward by the filter head 520 of the inner filter 510 (in direction of arrow K2 in FIG. 17). In the embodiment, the second sealing part 587 has an approximately semicircular transverse section, but is unnecessary to be limited thereto, and the second sealing part 587 may have various shapes. For example, the transverse section of the second sealing part 587 may be various polygonal shapes or have a structure having multiple protrusions instead of one protrusion.

Figure 20:
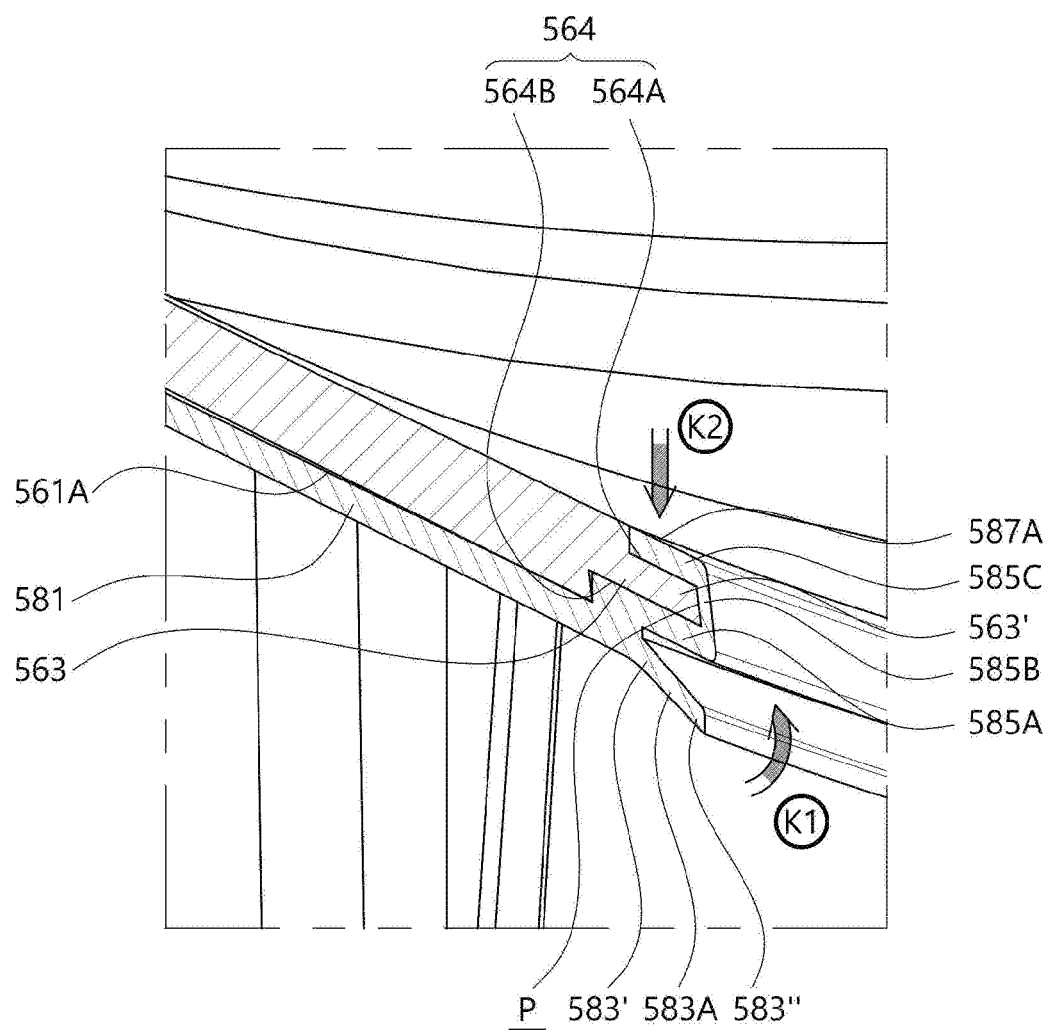
FIG. 20 is a section view showing a coupling portion between an outer filter and a sealing member that constitute another embodiment of the laundry processing apparatus according to the present disclosure.

Referring to FIG. 20, the second sealing part 587A is provided at on outer surface of the upper surface coupling plate 585C covering the upper surface of the seating end 560, and the second sealing part 587A may have a flat plate structure without protruding toward the inner filter 510. As a structure (not shown) protruding toward the second sealing part 587A from the surface of the inner filter 510, the second sealing part 587A and the inner filter 510 may be in contact with each other to perform the sealing function.

Looking again at FIG. 12, the sealing member 580 has the avoidance part 589. The avoidance part 589 is provided to avoid the second assembly part 576 of the outer filter 550, and the connector 585 is omitted in the portion (avoidance part). In the portion where the avoidance part 589 is provided, only the base 581 is coupled to the lower surface of the first seating end 563 to perform the sealing function.

Meanwhile, the first sealing part 583 and the second sealing part 587 are connected to each other through the connector 585, and a structure in which the sealing member 580 is broken at the center thereof is possible. In this case, the first sealing part 583 may be coupled to the lower surface of the seating end 560 of the outer filter 550 and the second sealing part 587 may be coupled to the upper surface of the seating end 560. Further, the first sealing part 583 may also have a protruding structure with a rib shape like the second sealing part 587. On the contrary, the second sealing part 587 may have a cantilever-shape transverse section like the first sealing part 583. The first sealing part 583 and the second sealing part 587 may be variously modified as long as the airtightness can be increased through elastic transformation.

Meanwhile, looking at the sealing member 580B assembled to the second outer body 553 in FIG. 12, the connector 585 is provided at the center of the sealing member 580B while avoiding the misassembled prevention piece 559. The first sealing part 583 is connected to opposite ends of the sealing member 580B, but the second sealing part 587 is provided only in a portion where the connector 585 exists. That is, the second sealing part 587 is not provided in the portion of avoiding the misassembled prevention piece 559. As described above, the above structure may be modified in response to the structure of the inner filter 510.

Figure 9:
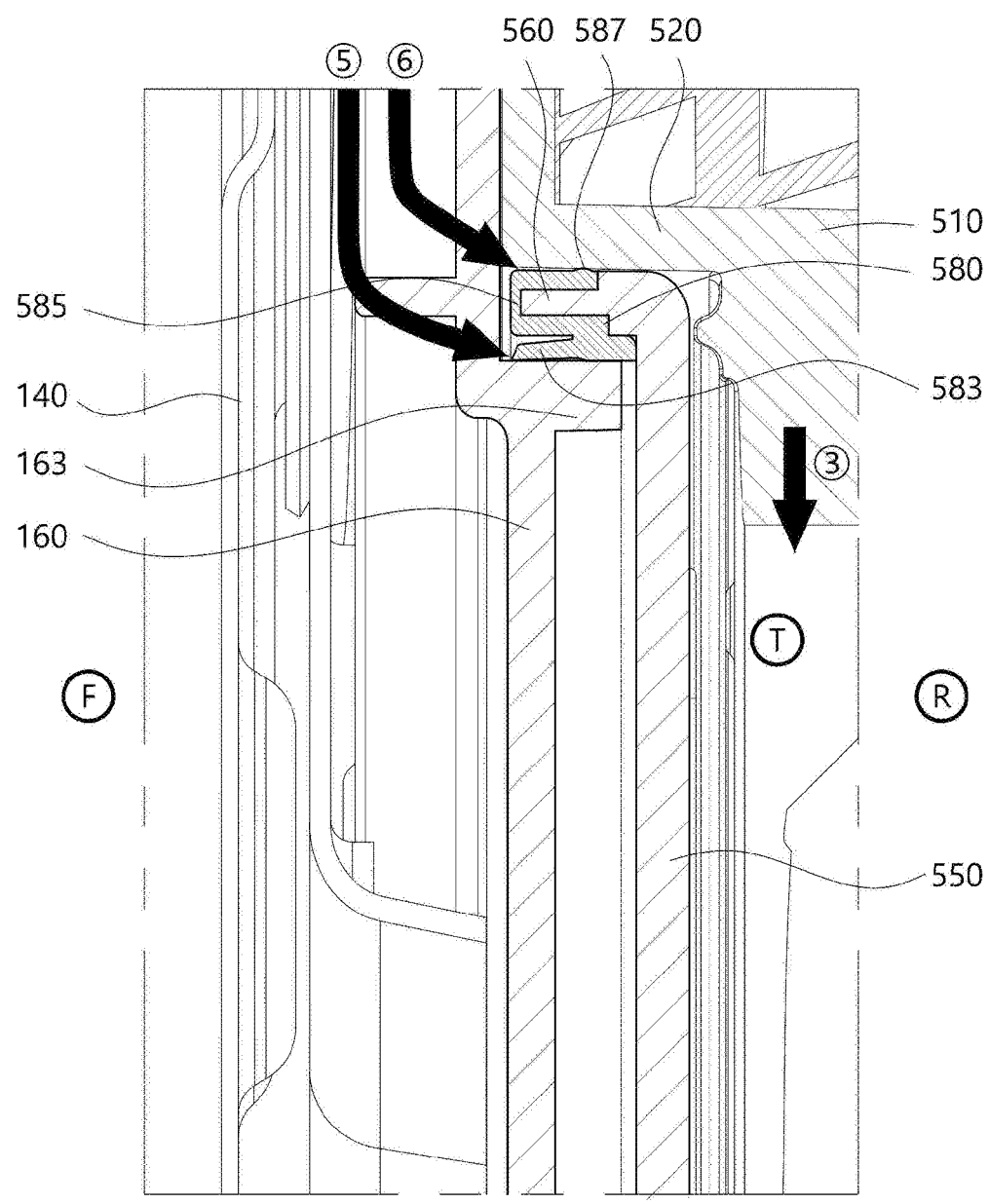
FIG. 9 is an enlarged view showing part B in FIG. 5.
Figure 10:
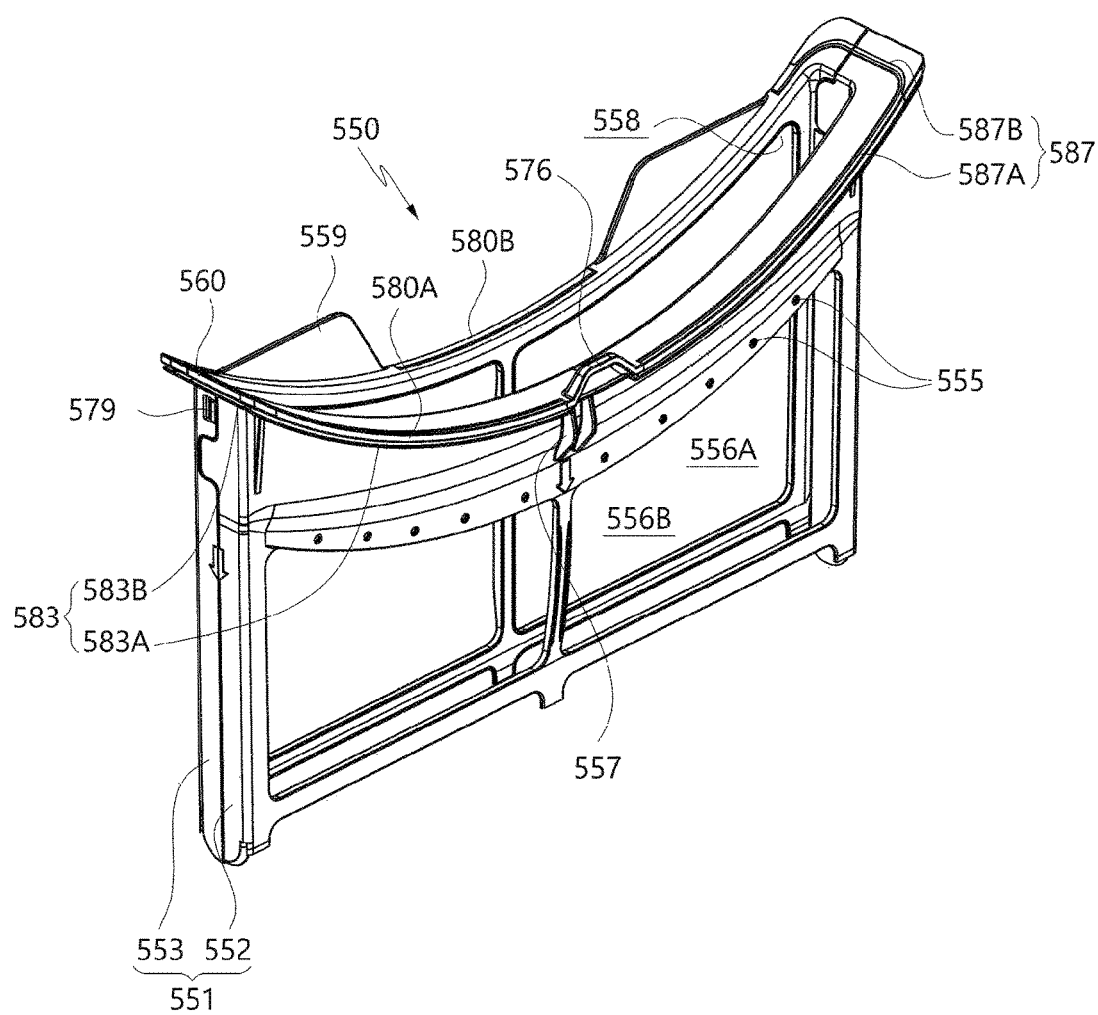
FIG. 10 is a perspective view showing a structure of an outer filter constituting the embodiment of the present disclosure.

In FIG. 9, which is an enlarged view of part B in FIG. 5, it is shown that the sealing is performed by the sealing member 580 assembled to the second outer body 553. As shown in the drawing, the first sealing part 583 is elastically transformed upward while being compressed by the holding end 163 of the filter holder 160 to block the gap between the holding end 163 and the seating end 560 of the outer filter 550. Of course, the base 581 together with the first sealing part 583 performs the sealing function while being compressed between the outer filter 550 and the holding end 163. Therefore, inflow of the circulated air in the direction of arrow ⑤ may be prevented.

When the circulated air is introduced through the gap between the seating end 560 and the holding end 163, the circulated air is discharged through the lower side of the guide duct 310 without passing through the filter assembly 500, so that the no debris are filtered. Accordingly, at the portion, the base 581 and the first sealing part 583 cooperate to increase the airtightness, and guide the circulated air to pass through the filtration space (T).

Looking at FIG. 9, the second sealing part 587 performs the sealing function between the inner filter 510 and the outer filter 550, more precisely, the second sealing part 587 performs the sealing function between the edge of the seating end 560 of the outer filter 550 and the lower side of the filter head 520 of the inner filter 510. The second sealing part 587 blocks the gap between the inner filter 510 and the outer filter 550 while being compressed by the elasticity, thereby it is possible to prevent the circulated air introduced in the direction of arrow ⑥. When the circulated air is introduced in the direction of arrow ⑥, the circulated air passes through the mesh (M) of the outer filter 550, but does not pass through the mesh (M) of the inner filter 510, so that the debris collecting rate is inevitably reduced.

As described above, the present disclosure is configured such that, the first sealing part 583 and the second sealing part 587 seal the gap between the filter assembly 500 and the filter holder 160 and the gap between the inner filter 510 and the outer filter 550. The first sealing part 583 and the second sealing part 587 are connected to each other through the connector 585, and the broken portion is not provided therebetween. Accordingly, the first sealing part 583 and the second sealing part 587 may exist in the one sealing member 580, and the airtightness may be improved by blocking the circulated air that is introduced through the broken portion of the sealing member 580.

The drainage tank 700 may be disposed a left upper portion or a right upper portion of the drum 200. FIG. 1 depicts the drainage tank 700 installed at the left upper portion of the drum 200. A drainage cover 710 is disposed at a left upper end or a right upper end in a front surface of the laundry processing apparatus to correspond to a position of the drainage tank 700. The drainage cover 710 is formed to be gripped by hand and exposed to the front surface of the laundry processing apparatus. When the drainage cover 710 is pulled in order to empty the condensed water collected in the drainage tank 700, the drainage tank 700 is withdrawn from a water tank support frame 720 together with the drainage cover 710.

The controller 800 is installed in the laundry processing apparatus 100. The controller 800 is configured to control the operation of the laundry processing apparatus on the basis of a user input applied through the input part 132. The controller 800 may consist of a circuit board and devices mounted on the circuit board.

Hereinbelow, air flowing process by the filter assembly 500 of the present disclosure will be described with reference to FIG. 5. The high temperature circulated air discharged from the drum 200 is discharged to the guide duct 310 through the filter assembly 500 that is connected at a lower side of the drum 200. The inner filter 510 constituting the filter assembly 500 is open in the vertical and lateral directions, so that the circulated air may be introduced from the top (direction of arrow ① in FIG. 5) and the side (direction of arrow ② in FIG. 5) of the inner filter 510.

At this point, a part of the circulated air may be moved toward between the filter assembly 500 and the filter holder 160 or the inner filter 510 and the outer filter 550 without passing through the inner filter 510. The above flow may be seen as arrows ⑤ and ⑥ in FIGS. 8 and 9. However, in the present disclosure, the sealing member 580 blocks the flow to prevent the leakage of air.

More precisely, the first sealing part 583 is elastically transformed upward while being compressed by the holding end 163 of the filter holder 160 to block the gap between the holding end 163 and the seating end 560 of the outer filter 550 and block the air flow in the direction of arrow ⑤. The base 581 together with the first sealing part 583 is also compressed between the outer filter 550 and the holding end 163 to perform the sealing function. The base 581 is extended in the long shape across between the seating end 560 of the outer filter 550 and the holding end 163 to increase the airtightness. In addition, the first sealing part 583 is elastically transformed to block an opening of the gap between the seating end 560 and the holding end 163, so that the sealing performance may be further increased.

Meanwhile, the second sealing part 587 blocks the air flowing through the gap between the inner filter 510 and the outer filter 550 and, more precisely, the second sealing part 587 blocks the air flowing through a gap between the edge of the seating end 560 of the outer filter 550 and the lower side of the filter head 520 of the inner filter 510. The second sealing part 587 blocks the gap between the inner filter 510 and the outer filter 550 while being compressed by the elasticity, thereby the circulated air flowing in the direction of arrow ⑥ may be blocked.

As described above, paths through which the circulated air leaks are all blocked by the one sealing member 580. As a result, the inner filter 510 is open in the vertical and lateral directions, so that the circulated air is introduced only from the top (direction of arrow ① in FIG. 5) and the side (direction of arrow ② in FIG. 5) of the inner filter 510, and the circulated air is guided to be discharged downward while passing through the filtration space (T).

Finally, the circulated air passes through the filtration space (T) of the filter assembly 500 as shown in the direction of arrow ③ and then passes through the mesh (M) to be discharged downward or sideways. As shown in the arrow ④, some of the circulated air may be discharged sideways to be introduced into the guide duct 310, and some of the circulated air may be directly moved downward to be discharged through the lower end 315 of the guide duct 310. As a result, the circulated air passes through the mesh (M) even when being discharged in any direction, and debris may be filtered by the dual filter.

Although preferred embodiments of the present disclosure has been described for illustrative purposes, those skilled in the art will appreciate that various modifications, additions and substitutions are possible, without departing from the scope and spirit of the present disclosure as disclosed in the accompanying claims. Therefore, the preferred embodiments described above have been described for illustrative purposes, and should not be intended to limit the technical spirit of the present disclosure, and the scope and spirit of the present disclosure are not limited to the embodiments. The protective scope of the present disclosure should be interpreted by the accompanying claims, and all technical spirits within the equivalent scope should be interpreted as being included in the scope and spirit of the present disclosure.

What is claimed is:

1. A laundry processing apparatus comprising:
   a drum that defines a receiving space for receiving an object and that includes an open side for discharging air that circulates in the receiving space;
   a guide duct that guides the circulating air toward a heat exchange module; and
   a filter holder that is positioned between the drum and the guide duct and that is configured to detachably support a filter assembly,
   wherein the filter assembly includes an inner filter and an outer filter that at least partially overlap with each other and are configured to remove debris contained in the circulating air that is supplied to the guide duct,
   wherein a sealing member at least partially covers the outer filter and seals a first gap between the outer filter and the filter holder, and wherein the sealing member includes a portion that contacts the inner filter and that seals a second gap between the inner filter and the outer filter,
   wherein a first portion of the sealing member is configured to, based on the filter assembly being placed on the filter holder, be compressed between the outer filter and the filter holder, and
   wherein a second portion of the sealing member is configured to, based on the filter assembly being placed on the filter holder, be compressed between the inner filter and the outer filter.

2. The laundry processing apparatus of claim 1, wherein the sealing member comprises:
   a first sealing part that protrudes from the outer filter toward the filter holder and that seals the first gap; and
   a second sealing part that protrudes from the outer filter toward the inner filter and that seals the second gap.

3. The laundry processing apparatus of claim 1, wherein the outer filter comprises a seating end that protrudes along an edge of an insert hole of the outer filter that receives the inner filter, the seating end disposed between the inner filter and the filter holder, and
   wherein the sealing member is coupled to the outer filter and covers the seating end of the outer filter.

4. The laundry processing apparatus of claim 3, wherein the filter holder includes a filter storage space and a holding end that is positioned at an edge of the filter storage space and that supports the seating end of the outer filter,
   wherein the seating end of the outer filter is positioned between the holding end of the filter holder and a lower surface of a filter head of the inner filter that protrudes from an upper portion of the inner filter, and
   wherein, based on the outer filter and the inner filter being disposed in the filter holder, a first sealing part of the sealing member extends toward the holding end of the filter holder and a second sealing part of the sealing member extends toward the lower surface of the filter head of the inner filter.

5. The laundry processing apparatus of claim 3, wherein the sealing member comprises:
   a base that extends along a lower surface of the seating end of the outer filter and that is coupled to the outer filter;
   a first sealing part that protrudes from the base in an inclined direction toward the filter holder;
   a connector that extends from the base and that covers an outmost edge of the seating end of the outer filter; and
   a second sealing part that protrudes from the connector and that covers an upper surface of the seating end of the outer filter toward the inner filter.

6. The laundry processing apparatus of claim 5, wherein the first sealing part of the sealing member extends from the base less than the connector of the sealing member or the outmost edge of the seating end.

7. The laundry processing apparatus of claim 6, wherein the second sealing part of the sealing member is positioned between a lateral surface of the seating end of the outer filter and a portion of the inner filter that is received in the filter holder.

8. The laundry processing apparatus of claim 6, wherein the first sealing part includes a portion that is spaced apart from the lower surface of the seating end of the outer filter at a distance that gradually changes from the base toward a distal end of the first sealing part, and
   wherein, based on the outer filter being disposed in the filter holder, the first sealing part is flexed toward the seating end of the outer filter and is disposed between the lower surface of the seating end of the outer filter and the filter holder.

9. The laundry processing apparatus of claim 8, wherein the distal end of the first sealing part is thinner than a proximate end of the first sealing part that is connected to the base.

10. The laundry processing apparatus of claim 7, wherein the second sealing part extends along a longitudinal direction of the connector of the sealing member, and has a protruding height that gradually increases toward a center of the apparatus.

11. The laundry processing apparatus of claim 5, wherein the connector of the sealing member comprises:
    a lower surface coupling plate that contacts the lower surface of the seating end of the outer filter,
    a lateral surface coupling plate that is connected to the lower surface coupling plate and covers a lateral surface of the seating end of the outer filter, and
    an upper surface coupling plate that is connected to the lateral surface coupling plate and contacts the upper surface of the seating end of the outer filter,
    wherein the second sealing part protrudes from the upper surface coupling plate.

12. The laundry processing apparatus of claim 11, wherein the lower surface coupling plate, the lateral surface coupling plate, and the upper surface coupling plate of the sealing member define a pocket that partially receives the seating end of the outer filter.

13. The laundry processing apparatus of claim 11, wherein the lower surface of the seating end of the outer filter has a lower stepped surface that connects the lower surface coupling plate of the connector and that prevents the lower surface coupling plate from protruding toward the filter holder beyond the lower surface of the seating end of the outer filter, and
    wherein the upper surface of the seating end of the outer filter has an upper stepped surface that connects the upper surface coupling plate of the connector and that prevents the upper surface coupling plate from protruding toward the inner filter.

14. The laundry processing apparatus of claim 3, wherein a coupling rib protrudes from a lower surface of the seating end of the outer filter and is configured to increase a coupling force between an outmost edge of the seating end of the outer filter and a pocket of the sealing member.

15. The laundry processing apparatus of claim 1, wherein the sealing member is connected to the outer filter based on one of insert injection, thermal fusion, ultrasonic fusion, and laser fusion.

16. The laundry processing apparatus of claim 15, wherein the outer filter includes a plastic material and the sealing member includes thermoplastic styrenic elastomers.

17. A laundry processing apparatus comprising:
- a drum that defines a receiving space for receiving an object and that includes an open side for discharging air that circulates in the receiving space;
- a guide duct that guides the circulating air toward a heat exchange module; and
- a filter holder that is positioned between the drum and the guide duct and that is configured to detachably support a filter assembly that removes debris contained in the circulating air that is supplied to the guide duct,
- wherein the filter assembly comprises:
  - an outer filter that is mounted to the filter holder;
  - an inner filter that is inserted in an insert hole of the outer filter and that overlaps with the outer filter; and
  - a sealing member covers at least partially the outer filter and seals a first gap between the outer filter and the filter holder, the sealing member including a portion that contacts the inner filter and that seals a second gap between the inner filter and the outer filter,
- wherein a first portion of the sealing member is configured to, based on the filter assembly being placed on the filter holder, be compressed between the outer filter and the filter holder, and
- wherein a second portion of the sealing member is configured to, based on the filter assembly being placed on the filter holder, be compressed between the inner filter and the outer filter.

18. The laundry processing apparatus of claim 17, wherein the sealing member comprises:
- a first sealing part that protrudes from the outer filter toward the filter holder and that seals the first gap; and
- a second sealing part that protrudes from the outer filter toward the inner filter and that seals the second gap,
- wherein the outer filter comprises a seating end that protrudes along an edge of the insert hole of the outer filter that receives the inner filter, the seating end disposed between the inner filter and the filter holder, and
- wherein the sealing member is coupled to the outer filter and covers the seating end of the outer filter.

19. The laundry processing apparatus of claim 18, wherein the filter holder includes a filter storage space and a holding end that is positioned at an edge of the filter storage space and that supports the seating end of the outer filter,
- wherein the seating end of the outer filter is positioned between the holding end of the filter holder and a lower surface of a filter head of the inner filter that protrudes from an upper portion of the inner filter, and
- wherein, based on the outer filter and the inner filter being disposed in the filter holder, the first sealing part of the sealing member extends toward the holding end of the filter holder and the second sealing part of the sealing member extends toward the lower surface of the filter head of the inner filter.

20. The laundry processing apparatus of claim 17, wherein the sealing member comprises:
- a base that extends along a lower surface of a seating end of the outer filter and that is coupled to the outer filter;
- a first sealing part that protrudes from the base in an inclined direction toward the filter holder;
- a connector that extends from the base and that covers an outmost edge of the seating end of the outer filter; and
- a second sealing part that protrudes from the connector and that covers an upper surface of the seating end of the outer filter toward the inner filter.

* * * * *